(12) United States Patent
Gershman et al.

(10) Patent No.: US 11,454,795 B2
(45) Date of Patent: Sep. 27, 2022

(54) SURFACE SENSING IN OPTICAL MICROSCOPY AND AUTOMATED SAMPLE SCANNING SYSTEMS

(71) Applicant: Akoya Biosciences, Inc., Menlo Park, CA (US)

(72) Inventors: Russell Gershman, Lincoln, MA (US); Peter J. Miller, Cambridge, MA (US); Olavi Ollikainen, Tallinn (EE)

(73) Assignee: Akoya Biosciences, Inc., Menlo Park, CA (US)

( * ) Notice: Subject to any disclaimer, the term of this patent is extended or adjusted under 35 U.S.C. 154(b) by 85 days.

(21) Appl. No.: 15/837,956

(22) Filed: Dec. 11, 2017

(65) Prior Publication Data

US 2018/0172972 A1 Jun. 21, 2018

Related U.S. Application Data

(60) Provisional application No. 62/436,310, filed on Dec. 19, 2016.

(51) Int. Cl.
*G02B 21/26* (2006.01)
*G02B 21/24* (2006.01)
*G02B 21/06* (2006.01)

(52) U.S. Cl.
CPC ........... *G02B 21/244* (2013.01); *G02B 21/06* (2013.01); *G02B 21/241* (2013.01); *G02B 21/245* (2013.01); *G02B 21/26* (2013.01)

(58) Field of Classification Search
CPC .. G02B 21/241; G02B 21/245; G02B 21/244; G02B 21/26; G02B 21/06
See application file for complete search history.

(56) References Cited

U.S. PATENT DOCUMENTS 4,945,220 A 7/1990 Mallory et al.
2010/0073766 A1* 3/2010 Angros .................. B01L 3/545
359/397

(Continued)

FOREIGN PATENT DOCUMENTS

DE 103 04 105 8/2004 ............. G02B 21/24
JP H10-254123 9/1998 ............... G03F 1/08
WO WO 2016/019324 2/2016 ............... G03H 1/04

OTHER PUBLICATIONS

Copy of the International Search Report and Written Opinion of the International Searching Authority for International Application No. PCT/US2017/065596 by Examiner Felix Linke dated May 14, 2018 (17 pages).

*Primary Examiner* — Dave Czekaj
*Assistant Examiner* — Berteau Joisil
(74) *Attorney, Agent, or Firm* — Fish & Richardson P.C.

(57) ABSTRACT

The disclosure features methods and systems that include positioning a surface of a coverslip overlying a sample relative to an object plane of a microscope system, projecting a two-dimensional pattern of light onto the surface, where a focal plane of the two-dimensional pattern at a position of the surface is rotated by an angle β relative to the object plane, obtaining a two-dimensional image of the pattern of light reflected from the surface using a detector that includes an imaging sensor oriented perpendicular to a direction of propagation of the reflected pattern of light at the sensor, analyzing the image to determine a line of best focus of the pattern within the image, determining an offset of the line of best focus from an expected position of the line of best focus within the image, and determining a position adjustment of the surface based on the offset.

42 Claims, 11 Drawing Sheets

(56) References Cited

U.S. PATENT DOCUMENTS

2010/0294749 A1\* 11/2010 Kempe ................ B23K 26/046
                                                    219/121.72
2011/0134308 A1\*  6/2011 Arnz .................... G02B 21/244
                                                     348/345

\* cited by examiner

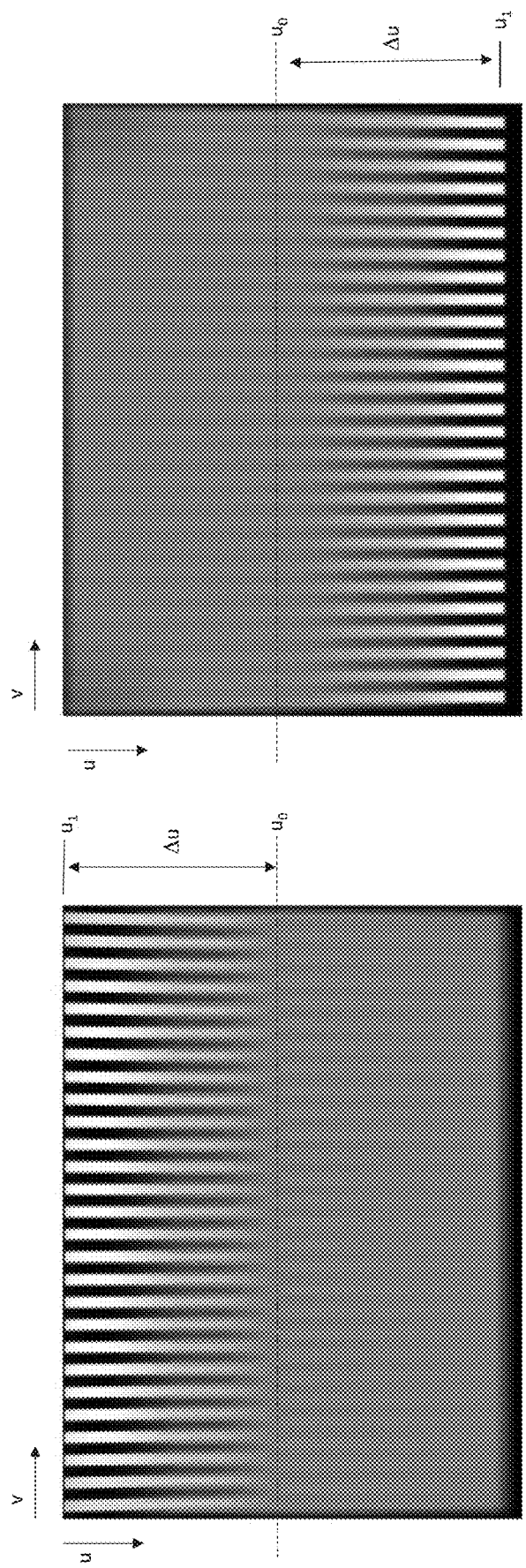

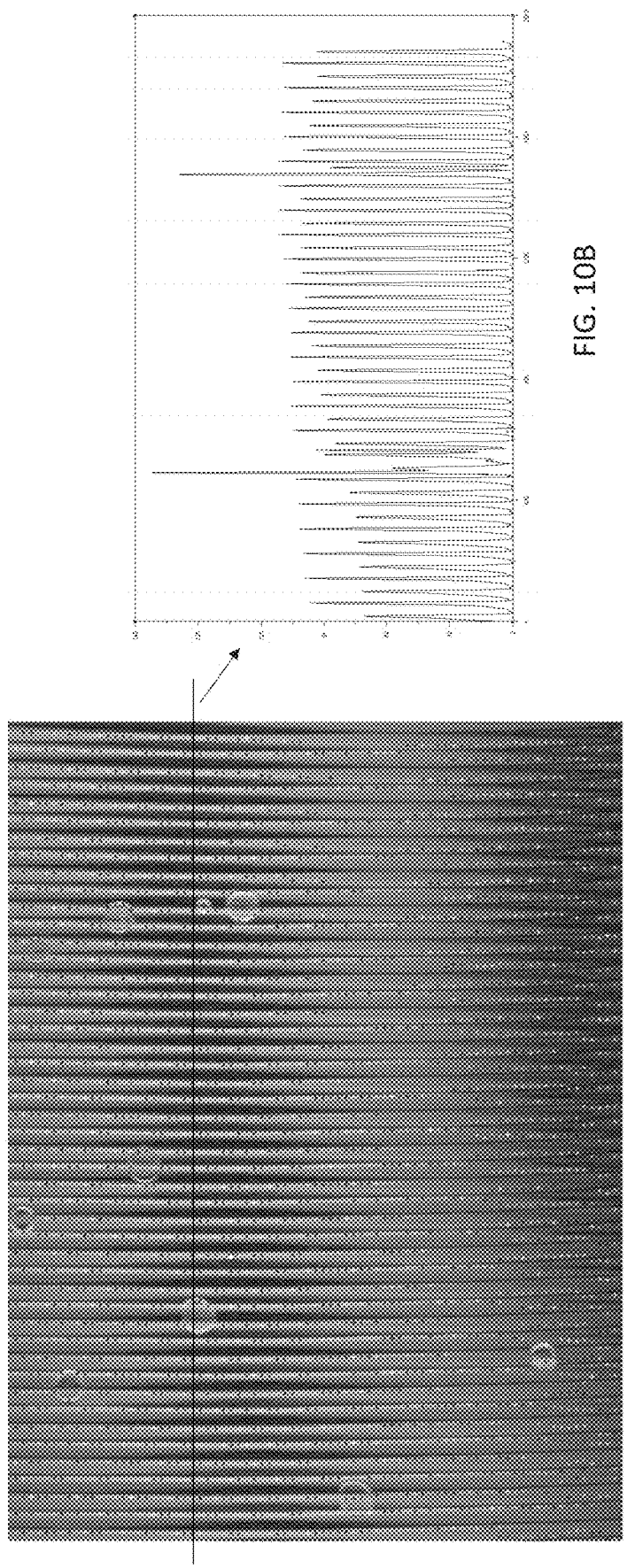

SURFACE SENSING IN OPTICAL MICROSCOPY AND AUTOMATED SAMPLE SCANNING SYSTEMS

CROSS-REFERENCE TO RELATED APPLICATIONS

This application claims priority to U.S. Provisional Patent Application No. 62/436,310, filed on Dec. 19, 2016, the entire contents of which are incorporated by reference herein.

TECHNICAL FIELD

This disclosure relates to optical microscopy, automated slide scanning systems, and sensing mounted samples.

BACKGROUND

Automated slide scanning systems are used for analysis of mounted samples. In particular, such systems are used for digitizing, archiving, and sharing images of samples. By acquiring and storing digital images, the images can be retrieved and analyzed by technicians (or by automated analysis systems) to grade or classify the samples, and also to identify disease conditions specific to particular samples.

SUMMARY

This disclosure features methods and systems for sensing surfaces in optical microscopes, automated slide scanning systems featuring such microscopes, and other optical inspection systems. For example, in slide scanning systems, a sample (e.g., a tissue sample) is typically immobilized on the surface of a microscope slide, and a coverslip is applied atop the mounted sample. Automated slide scanning systems attempt to locate the sample on the surface of the slide. Determining the position of the coverslip surface relative to the object plane of the optical microscope system used for imaging the sample is an important first step in this process, as it helps to reduce the complexity (i.e., the dimensionality) of the search process.

The methods and systems disclosed herein are typically performed before any images of the sample are obtained. Thus, the methods and systems effectively "re-use" the optical pathways and imaging components, first for determining the coverslip position, and then for acquiring images of the sample. Relative to other systems which include a second imaging system dedicated to "range finding", the systems disclosed herein are less complex and typically involve fewer components. Furthermore, because coverslip location and/or orientation is determined prior to imaging the sample, high quality images can be obtained without iteration during imaging to determine the position of the coverslip relative to the imaging system's object plane.

To determine the relative position of the coverslip and object plane of the imaging system, a two-dimensional pattern of light is projected onto the surface of the coverslip, and an image of the light pattern reflected from the coverslip surface is analyzed to determine the coverslip position relative to the object plane of the imaging system. The two-dimensional light pattern features a rotated focal plane such that only a portion of the reflected pattern of light is in focus on the detector used to image the pattern. The location of the focused portion of the pattern is used to determine the relative position of the coverslip and object plane of the imaging system.

Measuring the coverslip location in this manner can yield a number of important advantages. By accurately locating the surface of the coverslip, subsequent scanning operations to locate tissue of interest can be performed much more rapidly and accurately, leading to reduced imaging/processing times. This can be particularly important for samples that are imaged in fluorescence mode, as finding tissue can be time consuming and prone to confounding imaging artifacts arising from dust and other debris on the coverslip and slide surfaces. The methods can be performed at multiple locations on the surface of a coverslip to determine whether the coverslip surface (i.e., the surface height) varies across the sample; appropriate corrections can then be applied to ensure that the coverslip surface geometry is accounted for during subsequent slide scanning to locate tissue of interest. The methods can be performed rapidly, and sensing of the coverslip surface does not depend on (and nominally, is not influenced by) the nature of the sample. Thus, the process of locating the surface is independent of the tissue or other material that forms the sample, and can be performed in fully automated fashion.

In a first aspect, the disclosure features methods that include (a) positioning a surface of a coverslip overlying a sample relative to an object plane of a microscope system, (b) projecting a two-dimensional pattern of light onto the surface, where a focal plane of the two-dimensional pattern at a position of the surface is rotated by an angle $\beta$ relative to the object plane, (c) obtaining a two-dimensional image of the pattern of light reflected from the surface using a detector that includes an imaging sensor oriented perpendicular to a direction of propagation of the reflected pattern of light at the sensor, (d) analyzing the image to determine a line of best focus of the pattern within the image, (e) determining an offset of the line of best focus from an expected position of the line of best focus within the image, and (f) determining a position adjustment of the surface based on the offset.

Embodiments of the methods can include any one or more of the following features.

The methods can include determining a system adjustment based on the position adjustment, a thickness of the coverslip, and a thickness of the sample. The methods can include re-positioning the sample according to the system adjustment. The methods can include re-positioning the sample based on the offset, e.g., re-positioning the sample so that the sample is located in the object plane.

The methods can include determining the expected position of the line of best focus within the image.

The methods can include, for each one of a plurality of different locations on the surface of the coverslip, repeating steps (b)-(e) to determine a position adjustment of the surface for each one of the different locations, and determining whether a position of the surface relative to the object plane varies across the surface based on the position adjustments for each of the different locations.

A value of $\beta$ can be between 10 degrees and 30 degrees.

The two-dimensional pattern of light can include an array of alternating regions of higher light intensity and lower light intensity extending linearly in a common direction. The methods can include generating the two-dimensional pattern of light by projecting light generated by a light source through a transmissive Ronchi grating.

Analyzing the image to determine the line of best focus of the pattern within the image can include: calculating a gradient image from the image of the pattern of light reflected from the surface of the coverslip, where the gradient image includes alternating regions of higher light intensity and lower light intensity extending linearly in a common direction; for each one of a plurality of rows of pixels in the gradient image extending across the alternating regions of higher light intensity and lower light intensity, identifying a set of local light intensity maxima within the row of pixels and determining an average intensity maximum for the set of local light intensity maxima, and identifying the line of best focus as the row among the plurality of rows for which the corresponding average intensity maximum is largest.

The image of the pattern of light can include alternating regions of higher light intensity and lower light intensity extending linearly in a common direction, and analyzing the image to determine the line of best focus can include, for each one of a plurality of rows of pixels extending across the regions of higher light intensity and lower light intensity: determining an average intensity for the pixels in the row; determining an intensity variance for the pixels in the row; and identifying the line of best focus as the row among the plurality of rows for which a ratio of the intensity variance to the average intensity for the pixels in the row is largest.

The image of the pattern of light can include alternating regions of higher light intensity and lower light intensity extending linearly in a common direction, and analyzing the image to determine the line of best focus can include, for each one of a plurality of rows of pixels extending across the regions of higher light intensity and lower light intensity: determining an average intensity of pixels in the row that correspond to the regions of higher light intensity, $A_{high}$; determining an average intensity of pixels in the row that correspond to the regions of lower light intensity, $A_{low}$; and identifying the line of best focus as the row among the plurality of rows for which $|A_{high}-A_{low}|$ is largest.

Determining the position adjustment of the surface can include calculating the position adjustment as a linear function of the offset of the line of best focus from the expected position of the line of best focus within the image. Determining the position adjustment of the surface can include calculating the position adjustment based on the offset of the line of best focus from the expected position of the line of best focus within the image.

Analyzing the image to determine the line of best focus of the pattern within the image can include determining whether individual rows each featuring multiple pixels in the image or in a gradient image derived from the image correspond to the line of best focus. The individual rows can correspond to a range of different offsets from the expected position of the line of best focus. The range of different offsets can correspond to a range of different position adjustments of at least 50 microns (e.g., at least 100 microns, at least 300 microns).

The methods can include projecting the two-dimensional pattern of light onto the surface using an objective lens having an optical power of 10× or less (e.g., 4× or less).

The pattern of light can include an array of alternating regions of higher light intensity and lower light intensity extending linearly in a common direction, where the focal plane of the two-dimensional pattern at the position of the surface is rotated about an axis within a plane parallel to the object plane, and where the axis is orthogonal to the common direction.

Embodiments of the methods can also include any of the other features disclosed herein, including combinations of features disclosed in connection with different embodiments, except where expressly stated otherwise.

In another aspect, the disclosure features systems that include an illumination source configured to generate illumination light, an optical element configured to modulate the illumination light to generate a two-dimensional pattern of light, an apparatus configured to project the two-dimensional pattern of light onto a surface of a coverslip overlying a sample, a stage configured to support the sample, a detector configured to obtain a two-dimensional image of the pattern of light reflected from the surface and featuring an imaging sensor oriented perpendicular to a direction of propagation of the reflected pattern of light at the sensor, and a controller connected to the illumination source, the projection objective, the stage, and the detector, where the optical element is positioned so that a focal plane of the two-dimensional pattern is rotated by an angle $\beta$ relative to a plane of the surface, and where during operation of the system, the controller is configured to: (a) position a surface of the coverslip relative to an object plane of the system; (b) project the two-dimensional pattern of light onto the surface of the coverslip using the illumination source, the optical element, and the apparatus; (c) obtain the two-dimensional image of the pattern of light reflected from the surface of the coverslip; (d) analyze the image to determine a line of best focus of the pattern within the image; (e) determine an offset of the line of best focus from an expected position of the line of best focus within the image; and (f) determine a position adjustment of the surface based on the offset.

Embodiments of the systems can include any one or more of the following features.

The controller can be configured to determine a system adjustment based on the position adjustment, a thickness of the coverslip, and a thickness of the sample. The controller can be configured to re-position the sample according to the system adjustment. The controller can be configured to re-position the sample based on the offset. The controller can be configured to re-position the sample so that the sample is located in the object plane.

The controller can be configured to determine the expected position of the line of best focus within the image.

The controller can be configured to, for each one of a plurality of different locations on the surface of the coverslip, repeat steps (b)-(f) to determine a position adjustment of the surface for each one of the different locations, and determine whether a position of the surface relative to the object plane varies across the surface based on the position adjustments for each of the different locations.

The value of $\beta$ can be between 10 degrees and 30 degrees.

The two-dimensional pattern of light can include an array of alternating regions of higher light intensity and lower light intensity extending linearly in a common direction.

The optical element can include an array of alternating regions of higher optical density and lower optical density forming a transmission grating, where the regions extend linearly in a common direction.

The optical element can be oriented so that a plane of the optical element is rotated by an angle $\alpha$ relative to the object plane, and about an axis positioned in a plane parallel to the object plane and orthogonal to the common direction.

The controller can be configured to analyze the image to determine the line of best focus of the pattern within the image by: calculating a gradient image from the image of the pattern of light reflected from the surface of the coverslip, where the gradient image includes alternating regions of higher light intensity and lower light intensity extending linearly in a common direction; for each one of a plurality of rows of pixels in the gradient image extending across the alternating regions of higher light intensity and lower light intensity, identifying a set of local light intensity maxima within the row of pixels and determining an average intensity maximum for the set of local light intensity maxima; and identifying the line of best focus as the row among the plurality of rows for which the corresponding average intensity maximum is largest.

The image of the pattern of light can include alternating regions of higher light intensity and lower light intensity extending linearly in a common direction, and the controller can be configured to analyze the image to determine the line of best focus by: for each one of a plurality of rows of pixels extending across the regions of higher light intensity and lower light intensity, determining an average intensity for the pixels in the row, and determining an intensity variance for the pixels in the row; and identifying the line of best focus as the row among the plurality of rows for which a ratio of the intensity variance to the average intensity for the pixels in the row is largest.

The image of the pattern of light can include alternating regions of higher light intensity and lower light intensity extending linearly in a common direction, and the controller can be configured to analyze the image to determine the line of best focus by: for each one of a plurality of rows of pixels extending across the regions of higher light intensity and lower light intensity, determining an average intensity of pixels in the row that correspond to the regions of higher light intensity, $A_{high}$, and determining an average intensity of pixels in the row that correspond to the regions of lower light intensity, $A_{low}$; and identifying the line of best focus as the row among the plurality of rows for which $|A_{high} - A_{low}|$ is largest.

The controller can be configured to determine the position adjustment of the surface by calculating the position adjustment as a linear function of the offset of the line of best focus from the expected position of the line of best focus within the image. The controller can be configured to determine the position adjustment of the surface by calculating the position adjustment based on the offset of the line of best focus from the expected position of the line of best focus within the image.

The controller can be configured to analyze the image to determine the line of best focus of the pattern within the image by determining whether individual rows each featuring multiple pixels in the image or in a gradient image derived from the image correspond to the line of best focus. The individual rows can correspond to a range of different offsets from the expected position of the line of best focus. The range of different offsets can correspond to a range of different position adjustments of at least 50 microns (e.g., at least 100 microns, at least 300 microns).

The systems can be configured to determine a position adjustment of the surface of up to 50 microns (e.g., up to 150 microns) relative to the position of the surface of the coverslip relative to the object plane in step (a).

The apparatus can include an objective lens having an optical power of 10× or less (e.g., 4× or less).

Embodiments of the systems can also include any of the other features disclosed herein, including combinations of features disclosed in connection with different embodiments, except where expressly stated otherwise.

As used herein, a "coverslip" is a member that is used atop a sample (e.g., tissue and/or other biological material) mounted or fixed to a microscope slide or other support. Coverslips can be formed from a wide variety of materials including, but not limited to, glasses, plastics, polymers, and quartz, for example. In general, coverslips can be translucent or opaque at one or more wavelengths of light, and are at least partially reflective of incident light.

Unless otherwise defined, all technical and scientific terms used herein have the same meaning as commonly understood by one of ordinary skill in the art to which this disclosure belongs. Although methods and materials similar or equivalent to those described herein can be used in the practice or testing of the subject matter herein, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

In general, method steps described herein and in the claims can be performed in any order, except where expressly prohibited or logically inconsistent. It should be noted that describing steps in a particular order does not mean that such steps must be performed in the described order. Moreover, the labeling of steps with identifiers does not impose an order on the steps, or imply that the steps must be performed in a certain sequence. To the contrary, the steps disclosed herein can generally be performed in any order except where noted otherwise.

The details of one or more embodiments are set forth in the accompanying drawings and the description below. Other features and advantages will be apparent from the description, drawings, and claims.

DESCRIPTION OF DRAWINGS

FIG. 6B is a schematic diagram showing displacement of the line of best focus in a reflected image of a two-dimensional pattern of light.

FIG. 6C is a schematic diagram showing another displacement of the line of best focus in a reflected image of a two-dimensional pattern of light.

FIG. 10A is a gradient image calculated from an image of a two-dimensional pattern of light reflected from a surface of an imaging object, showing positions of local intensity maxima in multiple pixel rows.

FIG. 10B is a graph showing pixel intensity as a function of position for one row of pixels in the image of FIG. 10A.

Like reference symbols in the various drawings indicate like elements.

DETAILED DESCRIPTION

Figure 1:
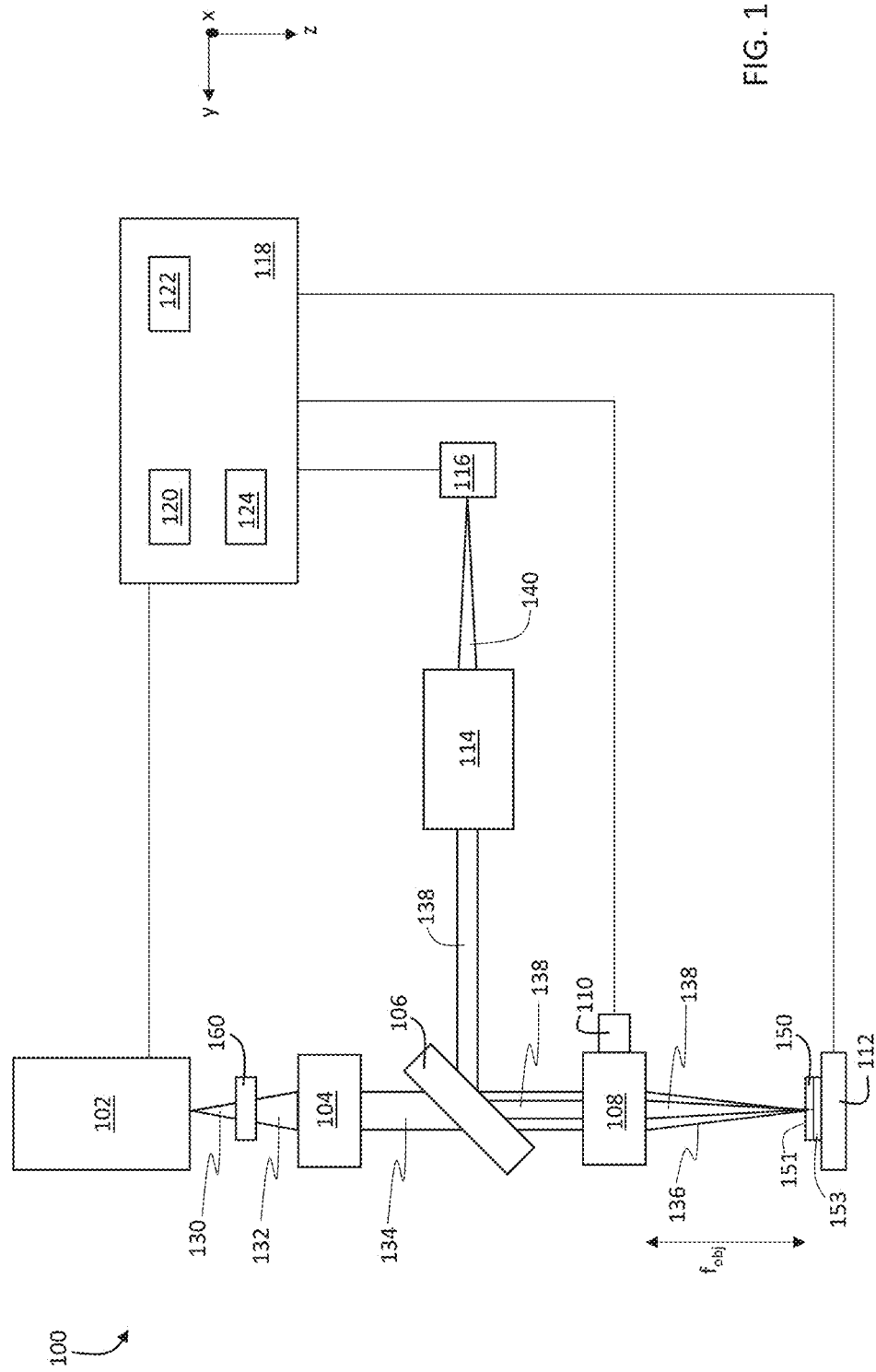
FIG. 1 is a schematic diagram of an optical microscope system.

Automated optical microscopes and slide scanning systems typically perform analyses of slide-mounted samples by locating tissue of interest on the slide, and then obtaining and analyzing detailed tissue images to extract a variety of qualitative and quantitative information, enabling one to perform tissue classification. Locating tissue of interest generally involves both finding the tissue and determining the position of the tissue relative to the microscope imaging system's object plane.

For slide-mounted samples that are imaged in brightfield imaging modes (i.e., absorption or transmission modes, for example), tissue of interest can be located relatively easily with a moderate depth of focus, even when the tissue is not located at the system's object plane. Once the tissue is located in the plane of the slide, the displacement of the tissue from the system's object plane can be determined in a straightforward manner using methods such as interpolation between focused measurements at different "heights" (i.e., object plane positions) orthogonal to the nominal surface of the slide.

Locating tissue of interest can be more difficult in samples that are prepared for and imaged in darkfield imaging modes such as fluorescence emission, however. In these imaging modes, locating the tissue extent can be more difficult due to the relatively weaker optical imaging signals. Thus, if integration times are too short during sample imaging, not enough light intensity is collected to accurately locate the tissue. Conversely, if integration times are too long, the collected light intensity can saturate the detector.

Locating tissue of interest in darkfield imaging modes is therefore a complex 5-dimensional problem, involving exploration of 3 spatial coordinates (e.g., x-, y-, and z-dimensions) as well as a spectral coordinate (i.e., the wavelength of illumination or detection) and a time coordinate. Along the spectral coordinate, tissue of interest may not be uniformly stained with a dye or stain that provides a measurable signal at the selected wavelength of illumination or detection. Along the time coordinate, as discussed above, underexposure of the sample may yield weak or unmeasurable signals, while overexposure may saturate the detector.

Further, confounding effects due to imaging artifacts that arise from dust, excess fluorescent dye, and/or other debris on sample and/or other surfaces (e.g., surfaces of slides and coverslips) are typically greater in darkfield imaging modes; dust in particular can fluoresce strongly at certain wavelengths, obscuring underlying tissue and making localization challenging. Because dust is not always coplanar with the sample, and can be located on coverslip surfaces and/or slide surfaces, strategies that mistake dust for the sample can yield erroneous results.

A certain amount of variability is also introduced by the sample height and by the slide profile. Samples in general are of irregular height, and thus, the upper surface of the sample (i.e., the surface closest to the objective lens) is not consistently located relative to the object plane from sample to sample.

Furthermore, individual slides can vary in thickness. For example, individual microscope slides can have a nominal thickness of approximately 1 mm, but may actually be between 0.9 mm and 1.1 mm thick; the variation in thickness can therefore be as much or greater than the thickness of the sample on the slide.

In addition, individual slides do not always register perfectly against the support structure (e.g., a microscope stage) in an imaging system. Slide-to-slide variations in the position of the slide relative to the support structure also result in variations of the position of the slide relative to the system's object plane.

Typically, a sample (e.g., a tissue or other biological sample) is mounted or affixed to the surface of a slide, and then a coverslip is applied atop the mounted sample. Coverslips that are used atop sample in this manner have relatively consistent thicknesses. Thus, the location of a sample relative to the system's object plane can be determined by measuring the location of the coverslip relative to the object plane, and more specifically, the location of the coverslip's upper surface (i.e., the surface on the opposite side from the surface that contacts the sample).

Thus, for illustrative purposes, the following discussion will focus on methods and systems for determining the location of the upper surface of the coverslip (referred to simply as the "surface of the coverslip") relative to the system's object plane. However, it should be understood that the methods and systems disclosed herein can also be applied to determine the locations of other surfaces relative to the object plane. For example, where samples flow through or are disposed in channels in a microfluidic substrate (i.e., a chip), the methods and systems disclosed herein can be used to determine the location of a surface of the microfluidic substrate. Thus, it should be understood that the following discussion is provided for explanation, and is not restricted only to determining the location of the surface of a coverslip.

In some alternative surface-locating methods, complex optical systems involving separate optical pathways for surface-locating light and imaging light are used. Separate optical components for each pathway are used. In certain methods, unusual detection geometries involving tilted detectors (i.e., tilted relative to the propagation direction of surface-locating light) are employed. In addition, some methods involve real-time monitoring of a surface as the surface is simultaneously imaged, and require that any deviations from ideal imaging conditions can be detected rapidly and at high resolution. These systems therefore tend to be costly and complex, with a relative large number of components.

In contrast, the methods and systems disclosed herein effectively re-use the optical imaging pathway in a microscope system to locate the sample relative to the system's object plane, and then to image the sample once it is properly positioned. That is, sample locating and sample imaging are performed in time sequential fashion rather than simultaneously. Because nearly all of the optical components of the system are used for both functions, the complexity of the optical configuration is significantly reduced relative to conventional systems.

In general, the methods disclosed herein are implemented after a slide-mounted sample has been introduced into the system and before high magnification images of the sample are acquired for archiving and analysis. High magnification sample imaging, e.g., for digital pathology, is greatly aided by first locating the sample to be imaged relative to the object plane of the imaging system. As will be discussed in greater detail below, the surface of a coverslip overlying the mounted sample is first located by directing a two-dimension light pattern onto the coverslip surface at relatively low optical power. From an image of the reflected pattern from the surface of the coverslip, a system offset is calculated and applied to the sample so that the sample is located in, or close to, the system's object plane (i.e., the sample is located at a position that is within 20 microns of the system's object plane, such as within 10 microns, or within 5 microns, of the object plane).

The sample is then translated in a plane parallel to the object plane and imaged to facilitate finding tissue of interest on the surface of the slide. Sample imaging at this stage can be performed either at low optical power (as for the determination of the coverslip location) or at high optical power. The sample images are analyzed to identify tissue of interest and the tissue coordinates along all three coordinate directions are stored.

Prior to obtaining detailed, high resolution sample imagery, the system can optionally perform a fine focus adjustment procedure. In this procedure, the system can determine an optimum focus position at a few different locations on the sample, thereby constructing a focus map for subsequent high resolution imaging.

The system then re-uses the same optical components—after switching out the low power objective lens for a high power objective lens, if this has not already occurred—to obtain high resolution images of the identified tissue of interest for use in digital pathology. Each of the foregoing steps is repeated without adjusting the position or orientation of the detector, along the same optical pathway to and from the sample, and with a relatively small number of adjustments to the system's optical components. By re-using system components and pathways in this manner, the sample can be reliably positioned within the system's object plane for imaging purposes, while at the same time significantly reducing the complexity of the system relative to conventional systems surface-finding systems.

Thus, the steps of locating and positioning the sample relative to the object plane, finding tissue of interest at different locations within a plane parallel to the object plane, and obtaining high magnification images of the tissue of interest once it has been found and properly positioned, are all performed in temporal sequence. The sequential nature of these operations allows various components of the imaging system to be used for different purposes at different points in time, with very little re-configuration of the system from one step to the next. Furthermore, although the operations are performed sequentially in time, the steps of locating and positioning the sample in the object plane and finding tissue of interest can be performed relatively rapidly so that despite the sequential nature of the operations, high resolution sample images can be obtained relatively rapidly under favorable imaging conditions.

FIG. 1 shows a schematic diagram of an optical microscope system 100. System 100 can be a stand-alone microscope system, or can be integrated into a larger system such as an automated slide scanning system. System 100 includes an illumination source 102, an optical modulator 160, a transfer lens 104, a beamsplitter 106, an objective lens 108 coupled to a movable lens mount 110, a movable stage 112, an imaging lens 114, and a detector 116. Illumination source 102, lens mount 110, stage 112, and detector 116 are connected to a control system 118 that includes a display interface 120, an input interface 122, and an electronic processor 124. Stage 112 supports a substrate 153 such as a microscope slide on which a tissue sample (not shown in FIG. 1) is immobilized. A coverslip 150 is positioned atop the sample. A rectangular coordinate system is also shown in FIG. 1.

During operation of system 100, illumination source 102 generates illumination light 130 which propagates along the z-direction and is incident on optical modulator 160. Optical modulator 160 modifies the spatial intensity distribution of illumination light 130 to generate modulated light 132, which corresponds to a two-dimensional light intensity pattern. Modulated light 132 also propagates in the z-direction and is collected by transfer lens 104, forming light 134.

Light 134 propagates along the z-direction, passes through beamsplitter 106, and is incident on objective lens 108, which directs light 134 onto surface 151 of coverslip 150 (i.e., the upper surface of coverslip 150). In this process, transfer lens 104 and objective lens 108 effectively re-image the two-dimensional light intensity pattern that emerges from optical modulator 160 in a plane that intersects with surface 151, as incident light 136. As will be explained in greater detail below, optical modulator 160 generates a two-dimensional light intensity pattern with a focal plane that is rotated relative to the plane of surface 151. Thus, when the rotated plane of incident light 136 intersects with surface 151, only a portion of incident light 136 (e.g., a portion extending along a line on surface 151) is in focus at surface 151. The portion of incident light 136 that is in focus forms the basis for the determination of the location of the coverslip surface.

In general, when incident light 136 is incident on surface 151 of coverslip 150, a portion of incident light 136 is reflected from surface 151 as reflected light 138. Reflected light 138 is collected by objective lens 108, reflects from beamsplitter 106, and is incident on imaging lens 114. Imaging lens 114 directs reflected light 138 to detector 116 as imaging light 140. The combined effect of objective lens 108 and imaging lens 114 is to image light from the system's object plane onto the system's image plane, which coincides with the position of detector 116. Thus, light that is focused at the position of the object plane (i.e., a portion of the two-dimensional light pattern generated by optical modulator 160) is also in focus at detector 116.

Nominally, surface 151 of coverslip 150 is positioned in the object plane of system 100, and detector 116 includes a two-dimensional imaging sensor which lies at the image plane of system 100. In this configuration, surface 151 is positioned at a distance $f_{obj}$ in the z-direction from objective lens 108, where $f_{obj}$ is the nominal focal length of objective lens 108.

Illumination source 102 can be implemented as a wide variety of different sources, including incandescent, fluorescent, diode-based, and laser-based sources. Illumination source 102 can include wavelength modulating elements such as filters to adjust the spectral distribution of illumination light 130.

Transfer lens 104 can be a single or compound lens, and can include one or more spherical or aspherical surfaces.

Transfer lens 104, although shown as a transmissive lens in FIG. 1, can also be implemented as a reflective lens. Similar considerations apply to objective lens 108. In some embodiments, objective lens 108 can be an infinity-corrected objective lens. Transfer lens 104 and objective lens 108 form a projection objective of system 100.

Imaging lens 114 can be a single or compound lens, and can include one or more spherical or aspherical surfaces. Imaging lens 114 can also be a reflective lens. In certain embodiments, imaging lens 114 can be implemented as a tube lens that includes multiple transmissive and/or reflective elements.

In addition to the elements discussed above, system 100 can also generally include a wide variety of other optical elements including, but not limited to, lenses, mirrors, beamsplitters, filters, polarization optics, windows, prisms, and gratings.

Detector 116 includes a two-dimensional imaging sensor that captures images of surface 151 (and/or objects positioned on surface 151). Any one or more of a wide variety of imaging sensors can be include in detector 116. For example, detector 116 can include CCD-based sensors, CMOS-based sensors, diode-based sensors, and other imaging sensors.

Control system 118 includes a display interface 120 upon which the control system can display images acquired by detector 116, user interface information, operating parameters, and other information. Input interface 122 (which can be implemented as part of display interface 120) allows a user of system 100 to enter commands, set operating parameters, adjust or select system configurations, and control other aspects of the operation of system 100.

Electronic processor 124 performs a variety of different system control and calculation functions. In general, through electronic processor 124, control system 118 can perform any of the configuration, operation, imaging, and analysis steps disclosed herein. Control system 118 (and electronic processor 124) is connected to illumination source 102, to lens mount 110, to stage 112, and to detector 116.

Control system 118 can transmit various control signals to illumination source 102 to adjust various properties of illumination light 102, including the intensity, wavelength, polarization state, and spatial intensity profile of the light. Control system 118 can also transmit control signals to lens mount 110 to adjust the position of objective lens 108 relative to coverslip 150, $z_{obj}$, along the z-direction. Control system 118 can transmit control signals to stage 112 to translate stage 112 in any one or more of the x-, y-, and z-directions. Thus, for example, to change the relative distance between objective lens 108 and stage 112 along the z-direction, control system 118 can transmit control signals to lens mount 110, to stage 112, or to both.

Image information captured by detector 116 is transmitted to control system 118. The image information is analyzed as will be discussed in greater detail below by electronic processor 124 to determine whether surface 151 is located in the object plane of system 100, and to determine a position adjustment of the projection objective (i.e., of objective lens 108) if surface 151 is not located in the object plane.

To determine whether surface 151 is located in the object plane of system 100 (which can also be the focal plane of objective lens 108 in some embodiments), optical modulator 160 is configured to generate a particular two-dimensional spatial light intensity pattern or distribution. An important feature of the spatial light intensity pattern is that the plane of the pattern (i.e., the focal plane) is rotated relative to the x-y plane. The spatial light intensity pattern with the rotated focal plane (which can, in some embodiments, be considered to be a rotated wavefront) is projected onto surface 151 by objective lens 108, and the light intensity pattern reflected from surface 151 is imaged onto the two-dimensional imaging sensor of detector 116.

A variety of different devices and optical configurations can be implemented in optical modulator 160 to generate a two-dimensional spatial light intensity pattern with a rotated focal plane. The following discussion focuses on one such modulator, a transmissive grating or ruling featuring alternating transmissive and non-transmissive regions that extend in a common direction (i.e., a Ronchi grating). However, other devices and configurations can also be used, including other diffractive optical elements, reflective and/or transmissive spatial light modulators (e.g., based on liquid crystal arrays), polarization-based modulators, and more generally, other pattern-forming elements that impart a particular spatial intensity modulation and focal plane rotation to illumination light 130.

Figure 2:
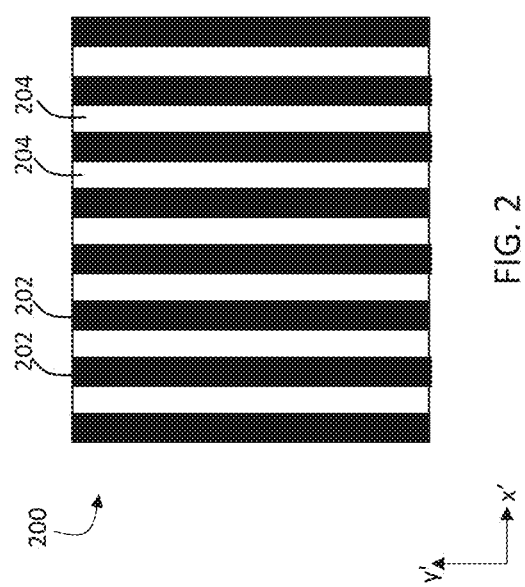
FIG. 2 is a schematic diagram of a transmissive grating.

FIG. 2 shows a schematic diagram of a transmissive grating 200 that includes alternating transmissive regions 204 and non-transmissive regions 202. The transmissive and non-transmissive regions each extend in a common direction y' in FIG. 2, and are periodic in the x'-direction. Transmissive grating 200 can be formed from an optically transparent material such as glass, for example, with a reflective coating material applied to the glass surface to form non-transmissive regions 204.

Where optical modulator 160 is implemented as a transmissive grating as shown in FIG. 2, the grating resolution can generally be selected as desired to provide suitable contrast for detection of the line of best focus in images of the reflected light pattern from surface 151. In some embodiments, for example, transmissive grating 200 can include 5 or more lines per mm (e.g., 10 or more lines per mm, 20 or more lines per mm, 30 or more lines per mm, 50 or more lines per mm, 100 or more lines per mm). The "lines" referred to above correspond to non-transmissive regions 202, and "lines per mm" refers to the number of such regions along a direction perpendicular to a common direction along which each of the non-transmissive regions 202 extend.

Where the two-dimensional light intensity pattern that is generated by optical modulator 160 includes alternating regions of relatively high and relatively low intensity, the intensity variation in a direction orthogonal to the direction of extent of the regions (i.e., in the x' direction) can generally have a variety of qualitative shapes. In some embodiments, for example, the variation in intensity along the x' direction can be approximately sinusoidal. In certain embodiments, the variation in intensity can be approximately rectangular, or can approximate a sawtooth (i.e., triangular) pattern.

Figure 3:
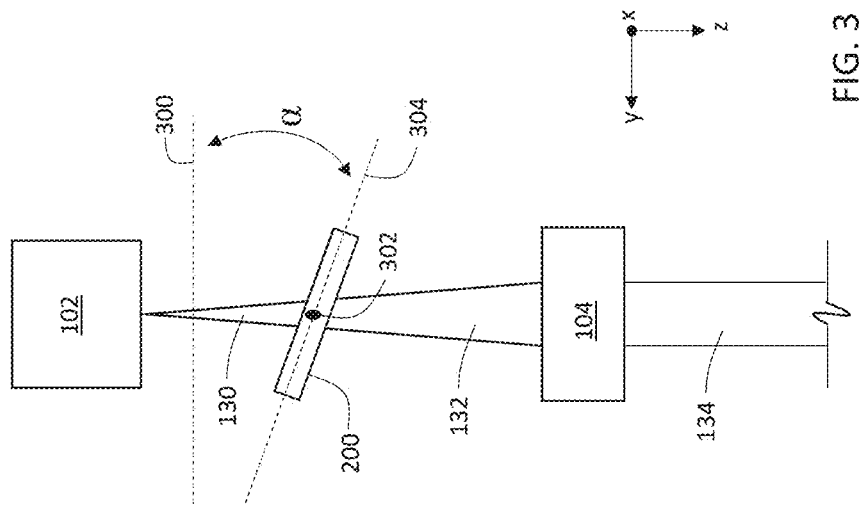
FIG. 3 is a schematic diagram of a portion of an optical microscope system.

FIG. 3 shows a schematic diagram of a portion of system 100, with optical modulator 160 implemented as transmissive grating 200. In FIG. 3, grating 200 is rotated by an angle α relative to a plane 300 orthogonal to the direction of propagation of illumination light 130. Because illumination light 130 propagates along the z-direction, plane 300 is parallel to the x-y plane.

In general, α can be any angle between 1 degree and 89 degrees. For example, in some embodiments, α is between 5 degrees and 60 degrees (e.g., between 5 degrees and 50 degrees, between 5 degrees and 40 degrees, between 10 degrees and 40 degrees, between 10 degrees and 30 degrees). In certain embodiments, α is 20±5 degrees.

The rotation angle α of grating 200 with respect to the x-y plane causes rotation of the focal plane of modulated light 132, and correspondingly, light 134 and incident light 136.

The rotation angle of incident light 136 at the object plane of system 100 depends on the magnification M of the projection objective formed by transfer lens 104 and objective lens 108. Specifically, for a magnification M at the system's object plane relative to the position of optical modulator 160, the rotation angle of the focal plane of incident light 136 at the object plane is β=Mα. Note that for purposes of this definition, the magnification M is defined as the ratio of the image size at the position of the object plane of system 100 to the image size at the position of optical modulator 160. For example, if the image size at optical modulator 160 is larger than the image size in the object plane of system 100 by a factor of 4, then M=¼, and β=α/4.

It should also be noted, however, that more generally, the rotation angle α of optical modulator 160, if any, may not be linearly related to the rotation angle of the focal plane of modulated light 132. For example, when optical modulator 160 is implemented as a spatial light modulator, the spatial light modulator may be oriented at normal incidence to the z-direction (i.e., in a plane parallel to the x-y plane), while the rotation angle of the focal plane of modulated light 132 is α. However, for modulated light 132 having a focal plane rotated at an angle α relative to plane 300 (i.e., relative to the x-y plane), the focal plane of incident light 136 in the object plane of system 100 is still rotated by an angle β=Mα.

In general, β can be any angle between 1 degree and 89 degrees. For example, in some embodiments, β is between 5 degrees and 60 degrees (e.g., between 5 degrees and 50 degrees, between 5 degrees and 40 degrees, between 10 degrees and 40 degrees, between 10 degrees and 30 degrees).

In FIG. 3, transmissive grating 200 is oriented such that the axis 302 about which grating 200 is rotated extends in a direction parallel to the x-axis. Further, grating 200 is oriented so that non-transmissive regions 202 and transmissive regions 204 extend linearly in a direction perpendicular to axis 302, in plane 304 (i.e., the plane of grating 200). That is, axis 302 extends in a direction parallel to the periodic direction of grating 200, and perpendicular to the common direction of extent of regions 202 and 204.

The focal plane of incident light 136, which is rotated by an angle β relative to the object plane of system 100, intersects the plane of surface 151 (which is nominally located in the object plane of system 100) along a line. The portion of incident light 136 that coincides with this line of intersection is in focus at the system's object plane, and is also in focus at the system's image plane, located at the position of the imaging sensor in detector 116. This portion of incident light 136 therefore produces the line of best focus in an image of imaging light 140, as will be discussed in more detail below. When surface 151 is displaced from the system's object plane, a different portion of incident light 136 produces the line of best focus in the image of imaging light 140. Thus, changes in the position of surface 151 relative to the system's object plane (i.e., in the z-direction) appear as shifts in the position of the line of best focus in images of imaging light 140 obtained by detector 116, and it is on this basis that the relative position of surface 151 can be determined.

Figure 4:
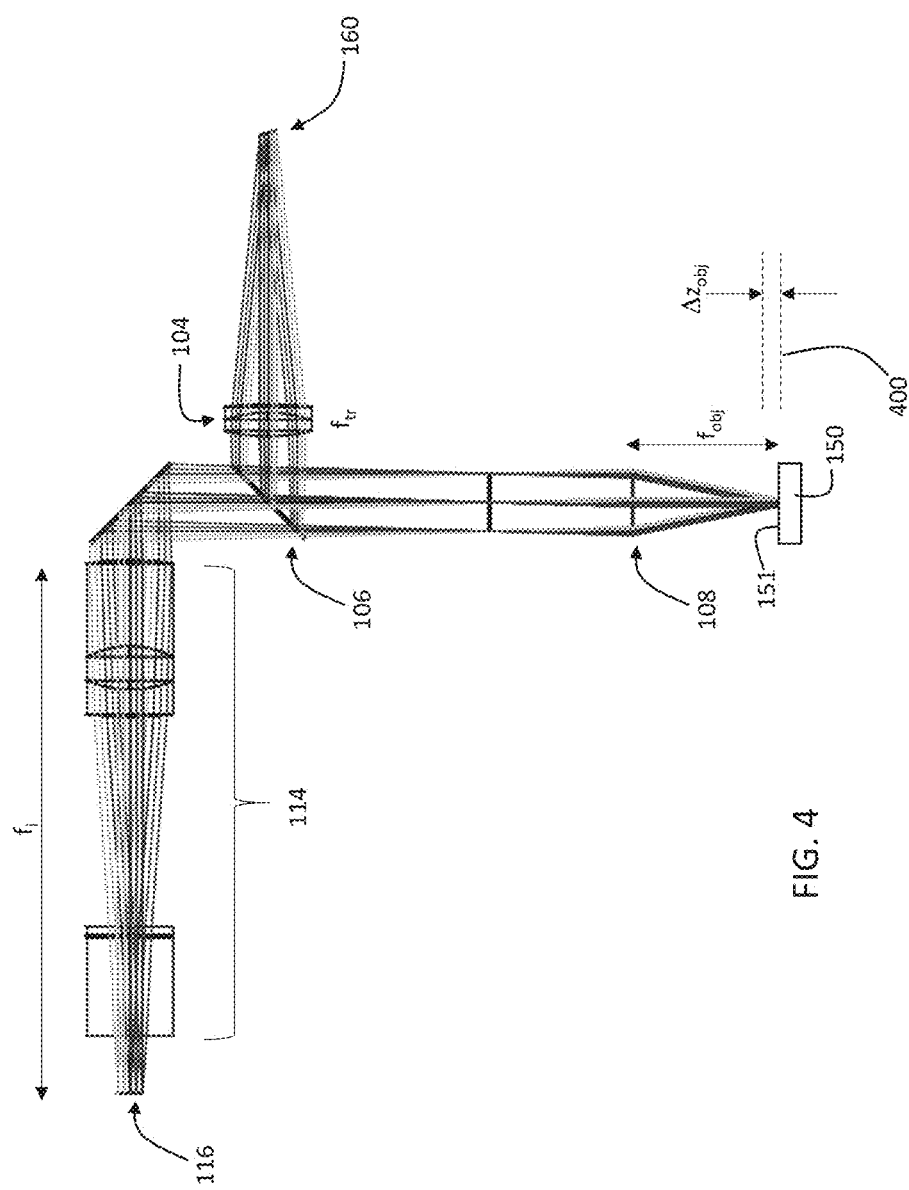
FIG. 4 is a schematic ray-tracing diagram of a portion of an optical microscope system.

FIG. 4 is a schematic diagram showing the optical configuration of system 100. As shown in FIG. 4, transfer lens 104 has a focal length $f_{tr}$, objective lens 108 has a focal length $f_{obj}$, and imaging lens 114 has a focal length $f_i$. With grating 200 oriented as shown in FIG. 3, the reflected light pattern that is imaged at detector 116 corresponds to an alternating pattern of high and low intensity regions extending in the vertical direction. When surface 151 is located in the object plane of system 100, the central region of the line pattern is nominally at optimum focus. That is, the position of best focus in the pattern image is located near the center of the image. When surface 151 is not located in the object plane (i.e., if surface 151 is displaced in the z-direction from the object plane), the line of best focus shifts in the pattern image obtained by detector 116.

In FIG. 4, the relative displacement of surface 151 from the object plane 400 of system 100 is $\Delta z_{obj}$. When $\Delta z_{obj}$ is non-zero, system 100 maps the value of $\Delta z_{obj}$ onto a displacement of the line of best focus in the image of the reflected light pattern measured by detector 116. For example, in an image that extends along orthogonal rectangular coordinate dimensions u and v, the line of best focus with surface 151 located at object plane 400 is at position $u_0$. However, when surface 151 is not located at object plane 400, the line of best focus in the image is located at $u_1$. The shift in position of the line of best focus in the image plane (i.e., the plane of detector 116), $\Delta u = u_1 - u_0$, can be determined from the focal lengths of the system lenses and the rotation angle α of the focal plane of modulated light 132 as follows:

$$\Delta u = \frac{2\left(\frac{f_i}{f_{obj}}\right)^2 \Delta z_{obj}}{\left(\frac{f_i}{f_{cl}}\right)\tan\alpha} \quad [1]$$

Thus, for example, with $f_{tr}$=50 mm, $f_{obj}$=50 mm, $f_i$=145.2 mm, and α=20°, $\Delta u$=15.96 $\Delta z_{obj}$.

Figure 5:
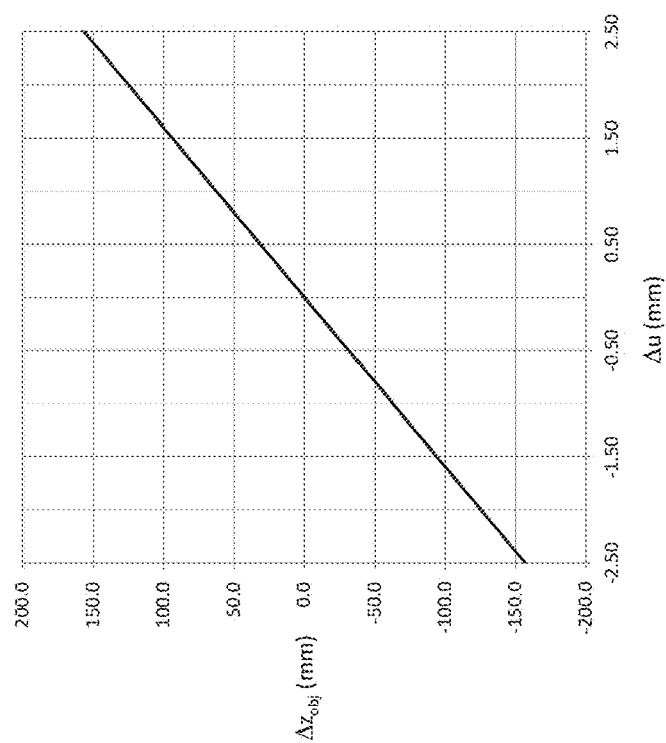
FIG. 5 is a graph showing displacement of a surface from an object plane as a function of displacement of a line of best focus in a reflected light image from the surface.

FIG. 5 is a plot showing displacement of surface 151 from object plane 400, $\Delta z_{obj}$, calculated as a function of displacement of the line of best focus in the image plane, Δu, from Equation (1) by rearranging terms to express $\Delta z_{obj}$ as the dependent variable, and using the focal lengths and focal plane rotation angle given above. As shown in FIG. 5, $\Delta z_{obj}$ and Δu are linear functions of one another. Thus, by determining the shift of the line of best focus in an image, Δu, the displacement of surface 151 from the object plane of system 100, $\Delta z_{obj}$ can readily be determined from Equation (1).

In other words, Δu corresponds to the offset of the line of best focus from its expected position, $u_0$, in the image plane at detector 116. From this offset, $\Delta z_{obj}$ can be readily determined. It should be noted that while $\Delta z_{obj}$ corresponds to the displacement of surface 151 of coverslip 150 from the object plane 400 of system 100, $\Delta z_{obj}$ can equivalently be considered a position adjustment of the projection objective, and in particular, a position adjustment of objective lens 108. That is, to correct for the displacement of surface 151 from the object plane 400, control system 118 can activate stage 112 to translate the stage (and coverslip 150) along the z-direction. Thus, $\Delta z_{obj}$ can be thought of as a position adjustment of the sample (and more specifically, surface 151 of coverslip 150) to compensate for displacement from the system's object plane.

Alternatively, $\Delta z_{obj}$ can be interpreted as the amount by which the projection objective (and more specifically, objective lens 108) is displaced from its optimum position along the z-direction, at which object plane 400 would coincide with surface 151. Thus, $\Delta z_{obj}$ can be thought of as a position adjustment of the projection objective (and in some embodiments, objective lens 108), and control system 118 can activate lens mount 110 to translate objective lens 108 along the z-direction to compensate for a non-zero value of $\Delta z_{obj}$. It should also be noted that control system 118 can optionally activate both lens mount 110 and stage 112 to compensate for a non-zero value of $\Delta z_{obj}$.

From FIG. 5, the lateral dimension of the pattern image in the u-direction is 5 mm. Thus, offsets of the line of best focus of up to ±2.5 mm can be measured in the pattern image. This range corresponds to a measurable displacement range of 328 microns (i.e., ±164 microns from the nominal object plane 400 of system 100) for surface 151.

Figure 6A:
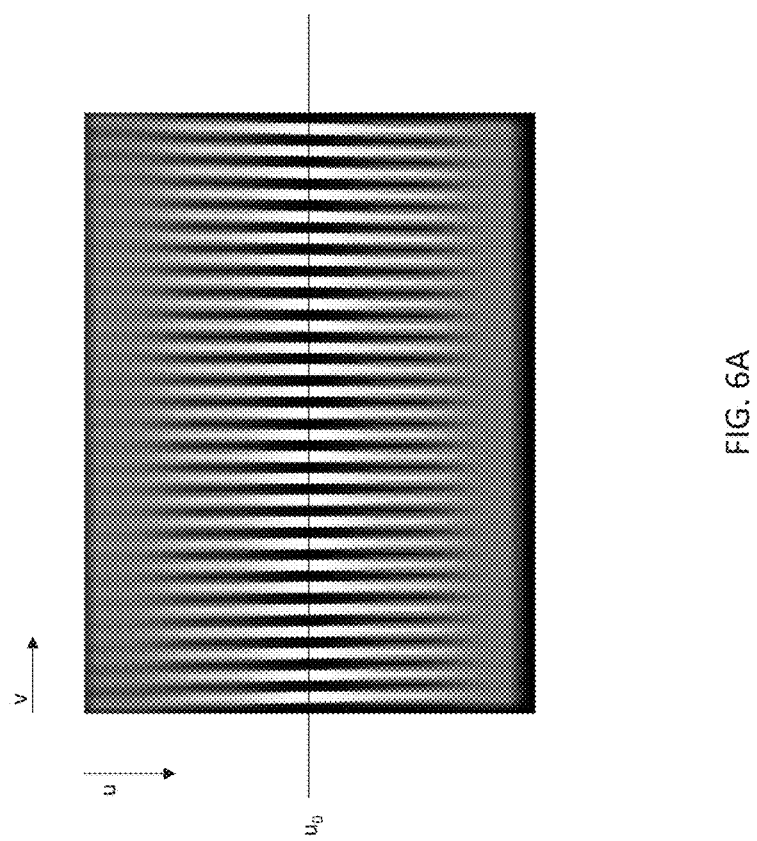
FIG. 6A is a schematic diagram showing an expected line of best focus in a reflected image of a two-dimensional pattern of light.

FIG. 6A is an image of the two-dimensional light pattern with rotated focal plane generated by optical modulator 160, reflected from surface 151, and imaged by detector 116. The image corresponds to a configuration in which surface 151 is located exactly at object plane 400. The line of best focus in the image is located at position $u_0$, which corresponds to the expected position of the line of best focus.

FIG. 6B is an image of the same two-dimensional light pattern reflected from surface 151 when surface 151 is displaced −160 microns from object plane 400. The line of best focus in FIG. 6B has shifted to position $u_1$, so that $\Delta u = u_1 - u_0 < 0$. FIG. 6C shows an image of the same pattern objected with surface 151 displaced +160 microns from object plane 400. The line of best focus shifts in the opposite direction to a new location $u_1$, so that $\Delta u = u_1 - u_0 > 0$.

System 100 can generally be used to measure a relatively wide range of position adjustments of the projection objective, $\Delta z_{obj}$. For example, in some embodiments, the range of position adjustments that can be measured is 50 microns or more (e.g., 100 microns or more, 200 microns or more, 300 microns or more, 400 microns or more, 500 microns or more, or even more).

Typically, the imaging depth (i.e., in the z-direction) at object plane 400 is inversely proportional to the square of the optical power of objective lens 108. Thus, by using an objective lens 108 of relatively low optical power, system 100 can measure the wide range of position adjustments discussed above. In certain embodiments, for example, the optical power of objective lens 108 is 10× or less (e.g., 8× or less, 4× or less, 2× or less).

It should be noted that after the location of surface 151 relative to object plane 400 in the z-direction has been determined and the relative displacement between surface 151 and objective lens 108 corrected, the sample underneath coverslip can be imaged using a different objective lens with significantly higher optical power. That is, objective lens 108 can be removed (i.e., via a rotating lens mount) from the optical path of system 100, and a higher power objective lens can be used to obtain sample images. In addition to providing for translation of objective lens 108, lens mount 110 can, in some embodiments, include multiple objective lenses (e.g., objective lens 108 and a high optical power objective lens) on a rotating wheel, and control system 118 can be configured to selectively insert objective lens 108 or the high optical power objective into the optical path of system 100 by transmitting appropriate control signals to lens mount 110.

As discussed above, by analyzing the image of the reflected two-dimensional light pattern, a position adjustment of the projection objective, or alternatively a position adjustment of the sample (or coverslip), can be determined. The position adjustment corresponds to a displacement of surface 151 from object plane 400, and is associated with a specific location on surface 151 (i.e., the location on which incident light 136 is incident, and from which the light reflects). If surface 151 is parallel to object plane 400, then the same position adjustment would be obtained at all locations on surface 151.

However, if surface 151 is not parallel to object plane 400 (e.g., if the slide on which the sample is mounted is not of uniform thickness, but is instead wedge-shaped), then different position adjustments might apply to different locations on surface 151. The foregoing analysis can be repeated at multiple locations (e.g., four corners) on surface 151, with control system 118 activating stage 112 to translate surface 151 in a plane parallel to the x-y plane to each of the new locations. At each location, a position adjustment $\Delta z_{obj}$ is determined as discussed above. The orientation of surface 151 relative to object plane 400 can then be determined from the different position adjustments, for example, by assuming that surface 151 is planar, and fitting the different position adjustments—taken as z-coordinate values in a coordinate system for which the object plane serves as a reference—to a plane equation, and calculating the angle(s) between the plane of surface 151 and object plane 400. Further, an approximate position adjustment can be determined for locations at which measurements have not been made directly by interpolating between position adjustments determined for nearby locations on surface 151.

Figure 7:
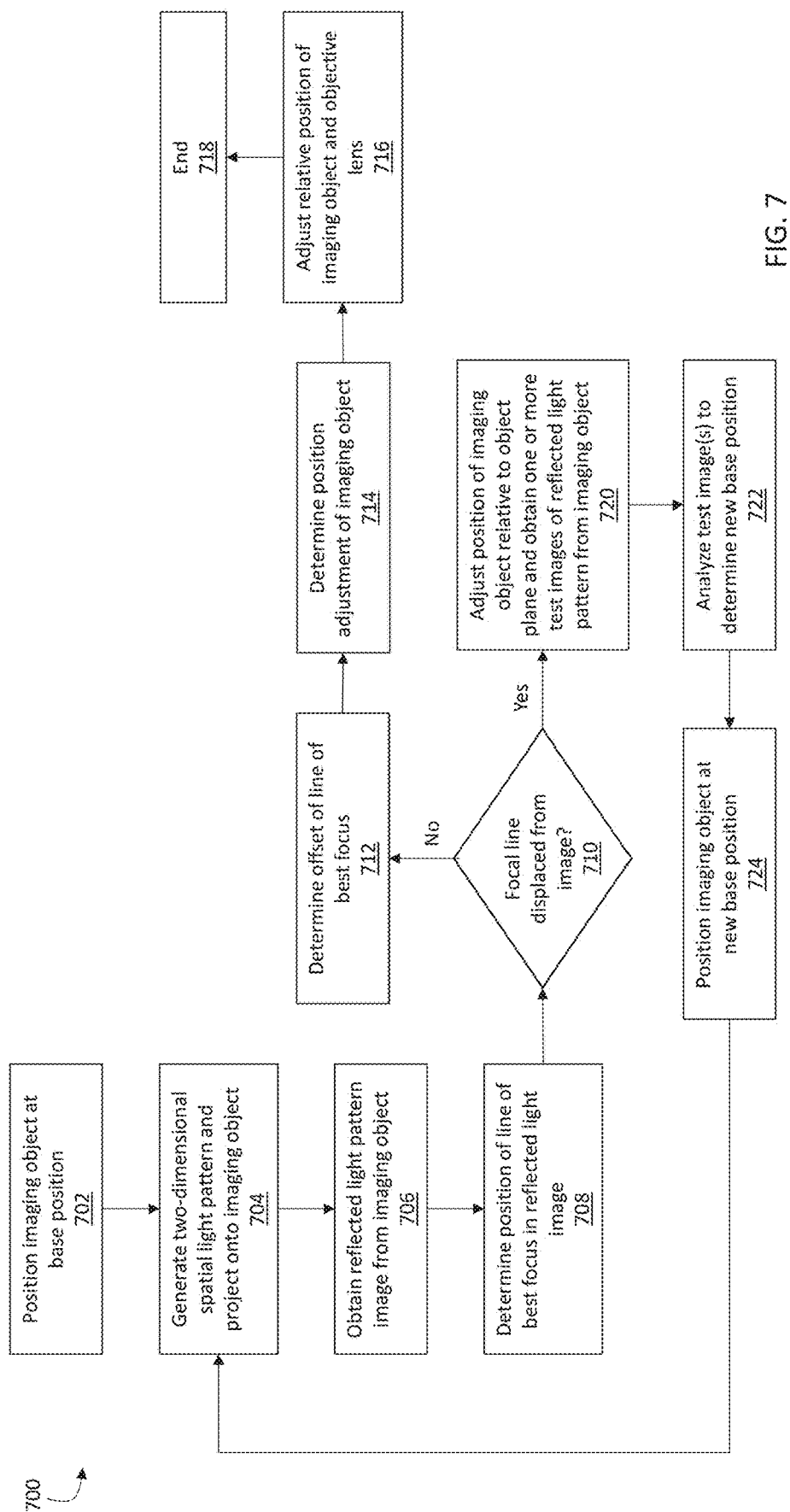
FIG. 7 is a flow chart showing a series of steps for determining a relative position adjustment for an imaging object and objective lens in an optical microscope system.

FIG. 7 is a flow chart 700 showing a series of steps for determining a position adjustment of a sample (i.e., surface 151 of coverslip 150 atop a mounted sample) or, in alternative terms, a position adjustment of a projection objective (i.e., a position adjustment for objective lens 108) of system 100. Flow chart 700 can equivalently be considered to show a series of steps for determining a displacement of a coverslip surface (or another surface) from an object plane of system 100.

The first step 702 includes positioning surface 151 in a base position, nominally corresponding to the object plane 400 of system 100. The nominal thicknesses of microscope slides, samples, and coverslips are available to control 118 as calibration information, as input information from a system user, or as hard-coded parameters. Accordingly, when a microscope slide with a mounted sample and coverslip is introduced onto stage 112, control system 118 activates stage 112, lens mount 110, or both stage 112 and lens mount 110, so that surface 151 of the coverslip is nominally positioned in the object plane 400 of system 100, i.e., the base position.

Next, in step 704, control system 118 generates a two-dimensional spatial light pattern by activating illumination source 102 to generate illumination light 130, which passes through optical modulator 160 and is converted into modulated light 132 corresponding to the spatial light pattern. As discussed above, in some embodiments, optical modulator 160 can be implemented as a passive device such as a transmissive diffraction grating. However, in certain embodiments, optical modulator 160 can be implemented as an active device (e.g., a spatial light modulator) connected to control system 118. Control system 118 can transmit control signals to optical modulator 160 to configure the modulator so that after passing through the modulator, modulated light 132 has a modified spatial light intensity distribution with a rotated focal plane (i.e., rotated relative to the x-y plane).

The spatial light intensity pattern carried by modified light 132 is projected onto surface 151 by the optical elements of the projection objective (i.e., transfer lens 104 and objective lens 108), as discussed above. Next, in step 706, the spatial light intensity pattern reflected from surface 151 is imaged by imaging lens 114 onto the imaging plane of system 100, where the imaging sensor of detector 116 is located. Detector 116 captures an image of the reflected light intensity pattern, and the image information is transmitted to control system 118 for analysis.

In step 708, control system 118 analyzes the reflected light intensity pattern image to determine a position of the line of best focus within the image. The line of best focus corresponds to a row of pixels, oriented approximately perpendicular to a direction of extent of alternating regions of higher and lower light intensity in the image. For example, referring to FIG. 6A for example, the alternating regions of higher and lower light intensity extend in the u-direction of the image, and the line of best focus is a row of pixels that extends in the v-direction (or approximately in the v-direction) of the image.

In general, the position of the line of best focus in the reflected light pattern image can be determined in a variety of ways. For example, in some embodiments, the line of best focus is identified as the pixel row in the image that extends in the v-direction for which the normalized variance in pixel intensity values is largest. For each row of pixels extending in the v-direction, control system 118 calculates a mean pixel intensity value m and a variance s equal to the square of the standard deviation of pixel intensity values for the row. Control system 118 then calculates the normalized variance for the row as (s/m). The pixel row in the v-direction with the highest value of (s/m) is selected as the position of the line of best focus. In certain embodiments, multiple rows of pixels extending in the v-direction are grouped together for the determination of the position of the line of best focus, and the position of the line is designated as the mid-row of the group of rows with collectively the highest (s/m) value among all of the groups of rows. Grouping rows in this manner can, in certain circumstances, lead to a more accurate determination of the line of best focus, as imaging artifacts and other sources of variance among pixel intensity values can be averaged out when pixel intensity values from multiple rows at a time are considered. For example, groups of 2 or more rows (e.g., 3 or more rows, 4 or more rows, 5 or more rows, 7 or more rows) can be used to determine the location of the line of best focus. It should be noted that the groups of rows need not all have the same number of rows; certain groups of rows can include more rows than others if desired, particularly in regions of the image where imaging artifacts are more pronounced and therefore have a greater confounding effect on the pixel intensity values.

Prior to performing quantitative determinations based on pixel intensity values, in certain embodiments, control system 118 can apply one or more thresholding conditions to ensure that pixel intensity values corresponding to imaging artifacts and other anomalous conditions are removed from further consideration. For example, in some embodiments, to eliminate individual pixel intensity values that are unusually bright due to reflections from the surfaces of bubbles (e.g., air bubbles) in a mounting medium used to affix the sample to a slide and/or in sample voids, individual pixel intensity values can be compared to an upper intensity threshold value. Pixel intensity values that exceed the threshold value are eliminated from consideration when pixel intensity mean and variance values for the row are calculated by control system 118. Thus, in some rows or groups of rows, the number of pixels that contribute to mean intensity and intensity variance calculations differs due to above threshold pixel intensity values.

Another method for locating the line of best focus within the image involves calculating the difference between the average pixel intensity values between the light and dark regions of the image within each row. As a first step in this procedure, control system 118 determines the pitch (or periodicity) of the alternating light and dark regions of the image by determining the distance between successive light or dark regions in the image in the v-direction.

Next, within each pixel row of the image extending in the v-direction, control system 118 assigns individual pixels as "light region" pixels or "dark region" pixels based on the pitch of the reflected image pattern. Control system 118 then calculates an average intensity value of the pixels corresponding to the light regions, $A_{high}$, and an average intensity value of the pixels corresponding to the dark regions, $A_{low}$. The line of best focus is determined as the pixel row for which the largest difference exists between the average intensity values of light and dark regions, $|A_{high}-A_{low}|$.

In some embodiments, the line of best focus is determined from a gradient image calculated from the reflected light pattern image obtained by detector 116. In an optional first step of such a procedure, control system 118 applies an upper thresholding condition to exclude pixels from further analysis for which the corresponding pixel intensity values exceed an upper intensity limit. As discussed above, doing so eliminates anomalous pixel intensity values arising from imaging artifacts such as reflection from bubbles and other surface debris on the coverslip. The upper intensity limit can be set according to the dynamic range of detector 116 at a level to avoid saturation of detector 116, for example.

Application of the thresholding condition can optionally be performed in combination with dilation of above-threshold groups of pixels to avoid the effects of imaging artifacts which may produce pixel intensity values that are anomalous, but not large enough to exceed the upper intensity limit. For example, control system 118 can analyze the reflected light image to identify clusters of pixels for which the pixel intensity exceeds the upper intensity limit for all pixels in the cluster. Each such cluster defines an anomalous area within the image.

Control system 118 can then expand the anomalous area by performing a dilation operation, so that all pixels within the expanded anomalous area are excluded from further analysis. For example, each anomalous area can be expanded by a dilation distance based on the pitch (or periodicity) of the reflected light pattern discussed above. The dilation operation can be, but need not be, symmetric in both the u- and v-directions. In some embodiments, for example, each anomalous area is expanded by a distance corresponding to ½ of the pattern pitch along the u-direction and ¼ of the pattern pitch along the v-direction.

Figure 11B:
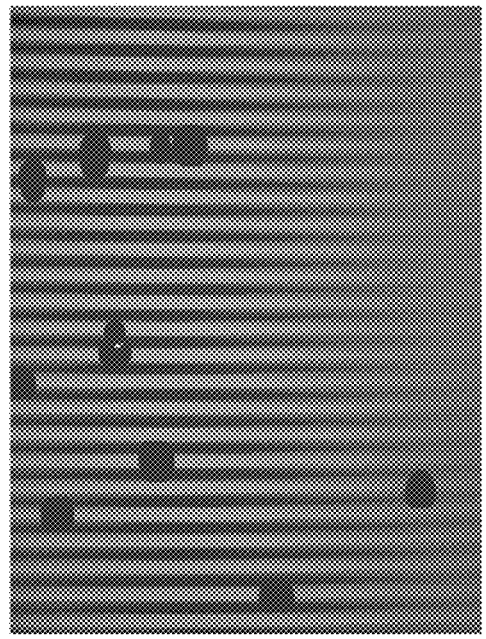
FIG. 11B corresponds to the image of FIG. 11A, in which a dilation mask has been applied to the marked pixels.
Figure 11A:
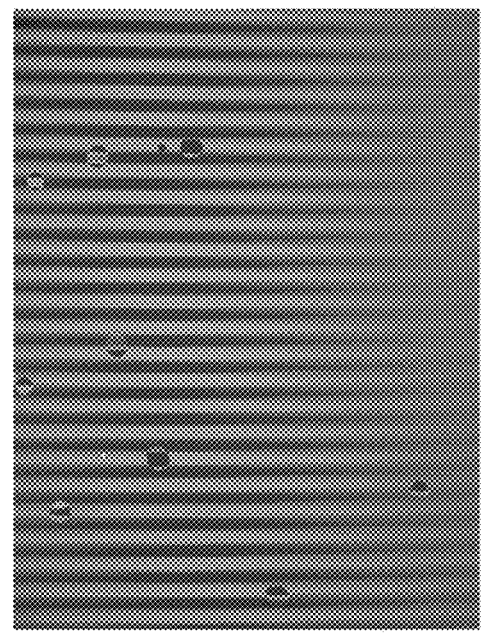
FIG. 11A is an image of a two-dimensional pattern of light reflected from a surface of an imaging object in which pixels having intensity values that exceed an upper intensity limit have been marked.

FIG. 11A is a reflected light pattern image in which pixels having intensity values that exceed an upper intensity limit have been identified and excluded from further consideration. The pixels form anomalous areas within the image, and are identifiable as the approximately circular regions within the image. FIG. 11B shows the reflected light pattern image of FIG. 11A after the anomalous areas have been dilated as discussed above. The dilated anomalous areas, representing pixels that are excluded from further consideration, are shown as the expanded dark circular regions within the reflected light pattern image.

In certain embodiments, control system 118 can optionally also remove pixels from further consideration for which corresponding pixel intensity values are less than a lower pixel intensity limit. As with the upper thresholding operation discussed above, applying a lower thresholding condition can be used to eliminate pixels with anomalously low corresponding pixel intensity values from further consideration.

Figure 8B:
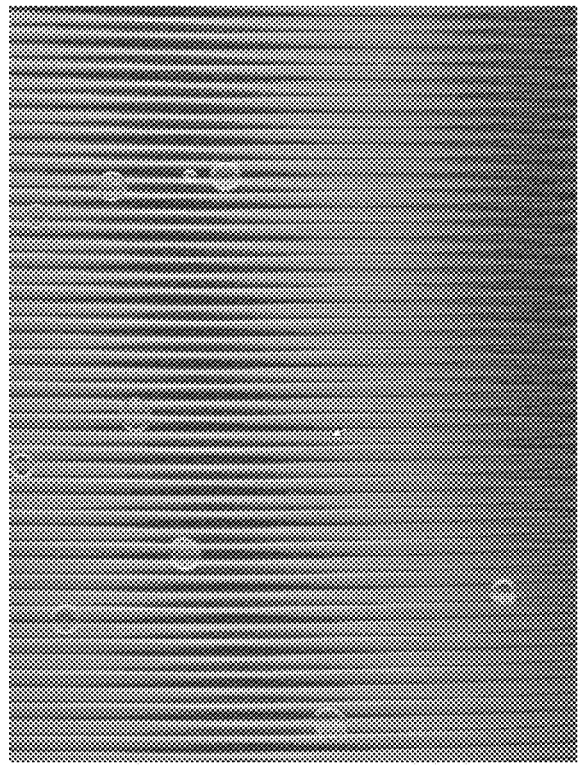
FIG. 8B is a gradient image derived from the image of FIG. 8A.
Figure 8A:
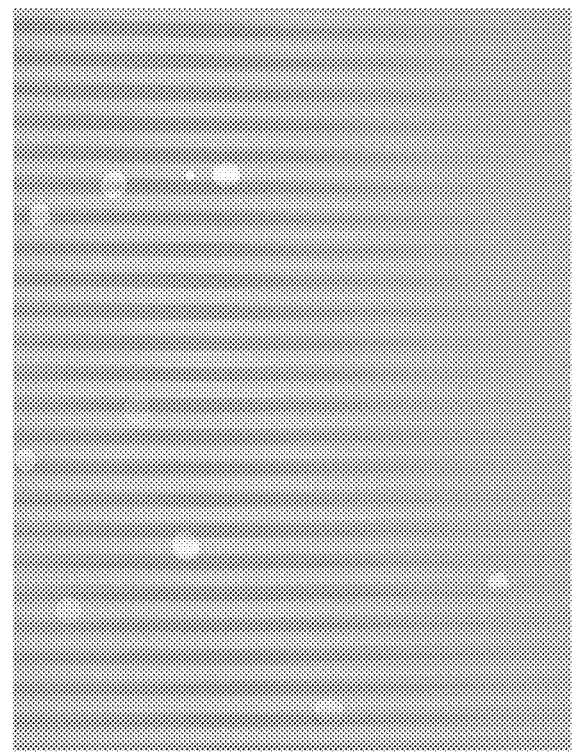
FIG. 8A is an image of a two-dimensional pattern of light reflected from a surface of an imaging object.

After pixels corresponding to anomalous pixel intensity values have been excluded from further consideration, control system 118 calculates a gradient image from the reflected light pattern image. Because the direction of periodicity of the reflected light pattern is in the v-direction, the gradient is calculated in the v-direction to emphasize transitions between light and dark regions within the reflected light pattern. FIG. 8A is an example of the reflected light pattern image obtained by detector 116, and FIG. 8B is a gradient image calculated by control system 118 from the image of FIG. 8A.

Figure 9A:
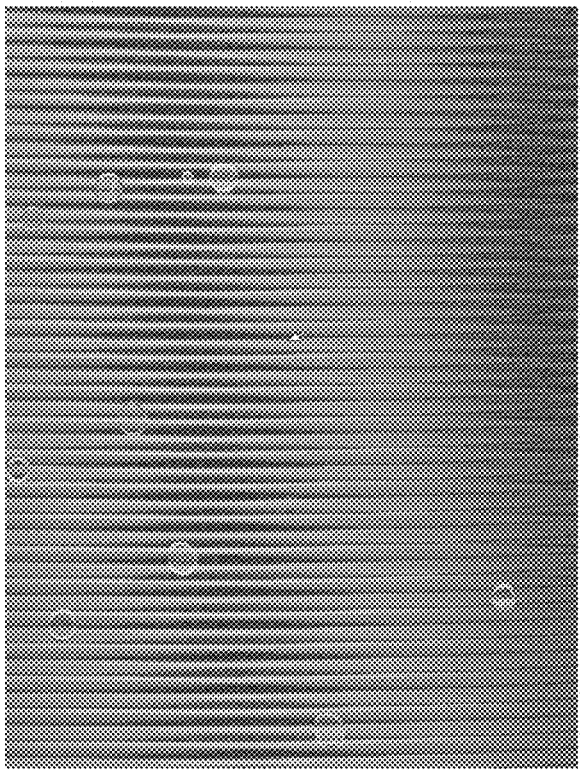
FIG. 9A is a gradient image calculated from an image of a two-dimensional pattern of light reflected from a surface of an imaging object.
Figure 9B:
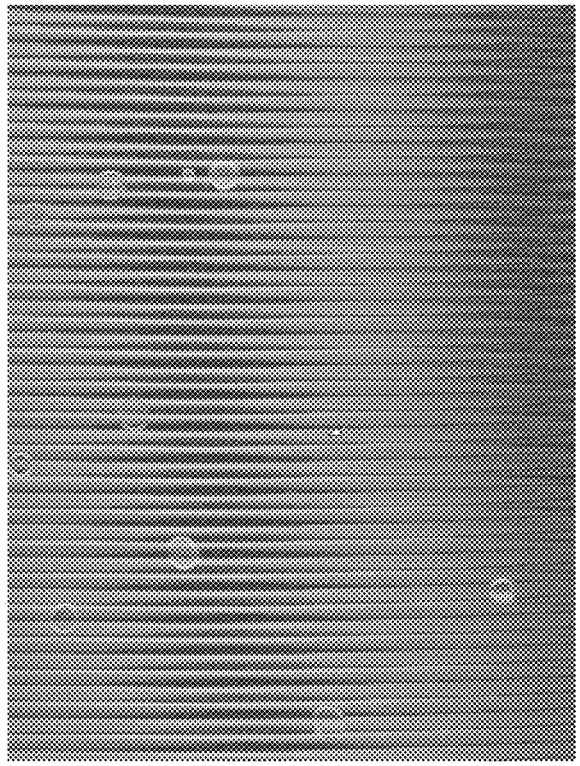
FIG. 9B is a smoothed gradient image calculated from the image of FIG. 9A.
Figure 9C:
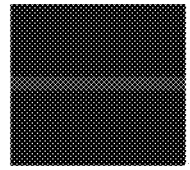
FIG. 9C is a schematic diagram showing a smoothing kernel used to calculate the image of FIG. 9B.

Next, the gradient image can optionally be smoothed by control system 118 using a line kernel extending in a direction parallel to the direction of extent of the light and dark regions of the gradient image (i.e., the u-direction). FIG. 9A shows a gradient image calculated as discussed above from a reflected light pattern image, and FIG. 9B shows the same gradient image after smoothing the image with the line kernel shown in FIG. 9C. Typically, the line kernel used for smoothing has a length in the u-direction of between 10 pixels and 20 pixels, for example.

Then, for multiple rows of pixels extending in the v-direction of the gradient image, control system 118 finds local intensity maximum values along the row. FIG. 10A shows an example gradient image, and FIG. 10B is a plot showing pixel intensity values as a function of pixel position in the v-direction along one row of the image of FIG. 10A. As shown in FIG. 10B, the set of pixel locations $\{v_i\}$ corresponding to the local intensity maxima is readily determined, for example, by applying thresholding and/or local pixel intensity comparison conditions. In some embodiments, for example, the pixel location $v_i$ with intensity $I_i$ is counted as a local intensity maximum if $I_i$ is the largest intensity within a v-directional line kernel, where the length of the v-directional line kernel is a selectable parameter. For example, the line kernel length along the v-direction can correspond to ¼ of the pitch of the reflected light pattern. The set of local maximum pixel intensities $\{I_i\}$ corresponds to the set of pixel locations $\{v_i\}$.

In general, control system 118 can be configured to analyze each pixel row in the gradient image, or control system 118 can be configured to analyze only selected pixel rows. For example, in certain embodiments, control system 118 analyzes every n-th row of pixels, where n is 2 pixels or more (e.g., 4 pixels or more, 6 pixels or more, 10 pixels or more, 12 pixels or more, 14 pixels or more, 16 pixels or more, 20 pixels or more, or even more). By analyzing only every n-th row of pixels in the gradient image, the overall analysis time can be reduced (relative to performing an analysis of every pixel row in the gradient image), and the line of best focus can still be located within the gradient image with a relatively high degree of accuracy.

For each pixel row that is analyzed, control system 118 then calculates the average local intensity maximum value $I_m$ for the set of pixels corresponding to local intensity maxima in the row as:

$$I_m = \frac{\sum_{i=1}^{N} I_i}{N} \quad [2]$$

where N is the number of local intensity maxima in the pixel row. The line of best focus in the gradient image can then be identified as the pixel row for which the value of $I_m$ is largest.

Figure 12:
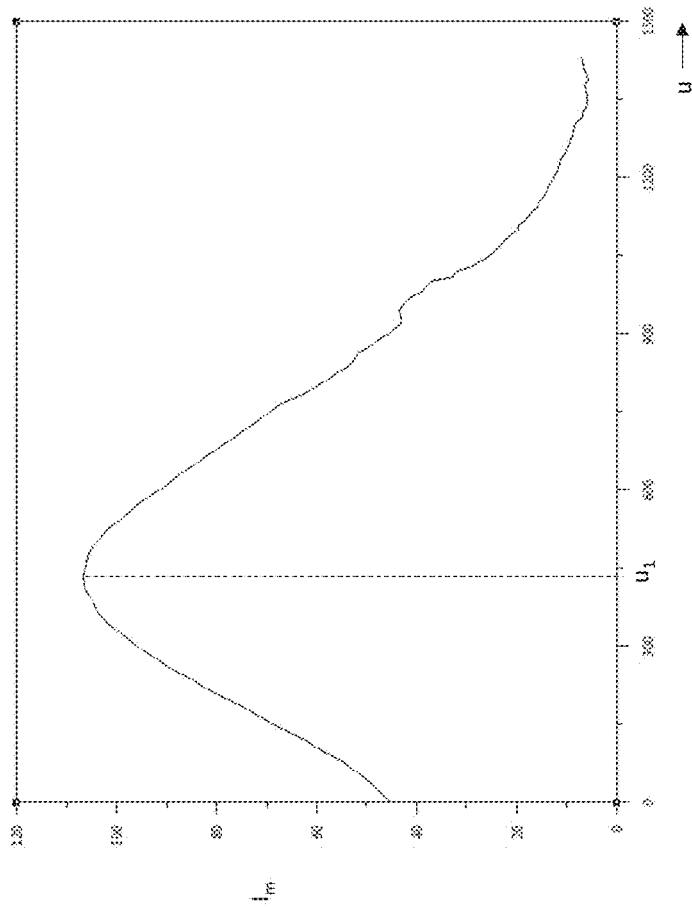
FIG. 12 is a graph showing average local intensity maximum value as a function of pixel row along one direction of a gradient image derived from an image of a two-dimensional pattern of light reflected from a surface of an imaging object.

FIG. 12 is a plot of $I_m$ as a function of row position along the u-direction of an example gradient image, calculated according to Equation (2). As shown in the plot, the maximum value of $I_m$ occurs at row $u_1$, which corresponds to the line of best focus in the gradient image (and also the corresponding reflected light pattern image).

Figure 13:
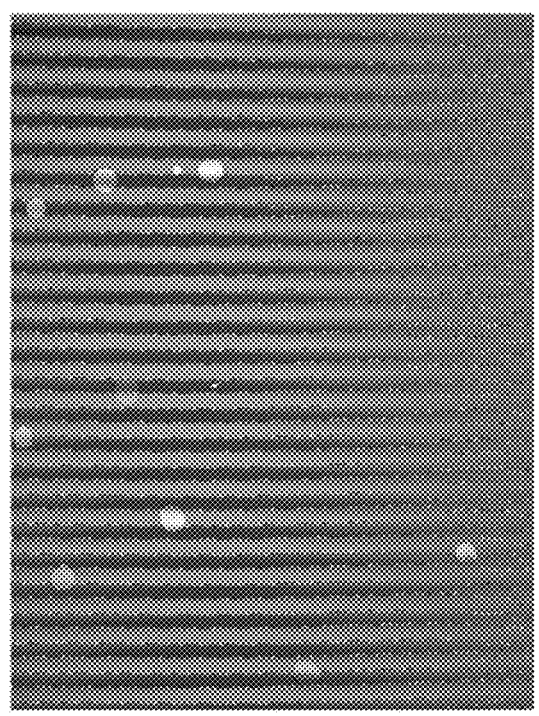
FIG. 13 is an image of a two-dimensional pattern of light reflected from a surface of an imaging object, with pixels corresponding to local intensity maxima marked, as identified from a corresponding gradient image.

FIG. 13 is an example of a reflected light pattern image obtained by detector 116, with individual local intensity maxima in multiple pixel rows identified from a corresponding gradient image (not shown). The local intensity maxima are indicated as dots in the image. The dots are positioned at the boundaries between the light and dark regions in the image, as the boundaries correspond to the locations where the gradient is largest.

Returning to flow chart 700 of FIG. 7, in the next step 710, control system 118 determines whether the focal line of the reflected light intensity pattern—that is, the portion of the reflected light intensity pattern is in best focus in the plane of detector 116—is actually located within the image, or is displaced laterally (i.e., in a direction within the plane of detector 116) from the region of space corresponding to the image. It should be noted that in general, step 710 can optionally be performed after step 708 as shown in FIG. 7, or before step 708. When step 710 is performed before step 708, step 708 is performed after step 710 and before step 720 in flow chart 700.

In some embodiments, step 710 is equivalent to determining whether the expected position of the line of best focus, $u_0$, is located on the image at all. In general, this determination can be made according to a wide variety of criteria. In some embodiments, for example, one a pixel row has been identified as the line of best focus in the image, the average pixel intensity for the row or the average intensity of the local intensity maxima in the row can be compared against a thresholding condition. If the average intensity is below or above the thresholding condition, control system 118 determines that the focal line of the reflected light pattern is not located on the image. This is equivalent to the determination that there is, in effect, no qualifying line of best focus in the image.

If the focal line of the reflected light pattern is not located on the image (that is, if the focal line is displaced from the image), control system 118 adjusts the relative displacement between object plane 400 and surface 151 so that a qualifying line of best focus is visible in the image of the reflected light pattern. In certain embodiments, as shown in step 720, control system 118 positions surface 151 at a set of different locations along the z-direction, $\{P_z\}$, and for each such location, obtains a test image using detector 116 of the reflected two-dimensional light intensity pattern. Control system 118 then analyzes each test image in step 722 to determine the line of best focus, and then determines whether the focal line of the reflected light pattern is within or displaced from the test image.

In this manner, in step 724, control system 118 finds at least one relative displacement between surface 151 and object plane 400 for which a qualifying line of best focus is positioned within the image. This relative displacement corresponds to the new base position of surface 151. To calibrate system 100 to locate the expected position of best focus, $u_0$, at approximately the center of the images acquired by detector 116, control system 118 can then optionally apply a corrective relative displacement between surface 151 and object plane 400, for example, which positions surface 151 at the new base position. Control then returns to step 704 in flow chart 700.

If the focal line of the two-dimensional reflected light intensity pattern in step 710 is located within the image in step 710 (i.e., the line of best focus is a qualifying line of best focus according to one or more criteria), then in step 712, control system 118 determines the offset of the line of best focus (located at position $u_1$) in the reflected light pattern image (or equivalently, in the gradient image) from the expected position of the line of best focus (at position $u_0$). The offset, designated as $\Delta u$, is calculated by control system 118 simply as $\Delta u = u_1 - u_0$.

Then, in step 714, control system 118 determines the position adjustment, $\Delta z_{obj}$. As discussed above, the position adjustment can also be thought of as a position adjustment of the sample (i.e., of the surface of the coverslip atop the sample)—the amount by which surface 151 is displaced from the object plane 400 of system 100. Alternatively, the position adjustment can be thought of as a position adjustment of the projection objective (i.e., of objective lens 108). The position adjustment can be calculated by control system 118 directly using Equation (1), using known/calibrated (or user-provided) values of the lens focal lengths and rotation angle $\alpha$.

Next, in step 716, control system 118 adjusts the relative position of surface 151 based on the position adjustment determined in step 714 to ensure that surface 151 is positioned in object plane 400. Relative position adjustment can include translating surface 151 in the z-direction, translating objective lens 108 in the z-direction, or both. Thus, control system 118 can be configured to activate lens mount 110, stage 112, or both, to make the relative position adjustment. The procedure then ends at step 718.

It should be noted that while in some embodiments, surface 151 is positioned at the exact location of object plane 400 via the relative position adjustment, more generally surface 151 is positioned to within a certain distance of object plane 400 by virtue of the relative position adjustment. For example, in certain embodiments, surface 151 can be positioned within 20 microns of object plane 400 (e.g., within 15 microns, within 10 microns, within 5 microns, within 2 microns, within 1 micron), measured in the z-direction.

The offset of the line of best focus is determined relative to an expected position, $u_0$, of the line of best focus in the reflected light pattern image. In some embodiments, the expected position $u_0$ can be stored as calibration information in an information storage unit connected to electronic processor 124, and retrieved by control system 118 during image analysis. Alternatively, control system 118 can receive information about the expected position $u_0$ from a system user through user interface 122, for example.

In some embodiments, control system 118 is configured to perform a calibration routine to determine the expected position $u_0$ of the line of best focus. To perform the calibration routine, a partially reflective element such as a coverslip can be positioned on stage 112, and the coverslip can be imaged using system 100 without projecting the two-dimensional pattern of light onto the coverslip surface. In some embodiments, the coverslip includes one or more fiducial markings on the coverslip surface. By translating the coverslip in the z-direction and obtaining images as a function of the coverslip's position along the z-direction, the coverslip can be positioned at a z-coordinate location where the fiducial(s) is/are in best focus on detector 116. This corresponds to locating the fiducial(s) in object plane 400. Thus, the location of object plane 400 is determined.

To determine the expected position of the line of best focus, control system 118 then projects the two-dimensional light intensity pattern generated by optical modulator 160 onto the surface of the coverslip and images the reflected pattern using detector 116, with surface 151 positioned in object plane 400. The line of best focus within the image obtained corresponds to the expected position of the line of best focus, $u_0$. The position $u_0$ can then be used as discussed above to determine the offset of the line of best focus in images of the two-dimensional reflected light intensity pattern from samples.

It should be noted that a wide variety of different fiducial markings are suitable for use in calibrating system 100. Furthermore, in some embodiments, control system 118 can use dust, bits of debris, and/or surface features/irregularities on surface 151 to effectively function as fiducial markings for the purpose of calibrating system 100. In general, any surface feature than can be reproducibly imaged to determine the location of object plane 400 within the coordinate system of stage 112 and/or lens mount 110 can function as a fiducial marking for calibration purposes.

As discussed previously, the procedure shown in flow chart 700 can be repeated by control system 118 at a plurality of different (x,y)-locations on surface 151 to determine an orientation of surface 151 in relation to object plane 400 (i.e., relative to the x-y plane). This can be particularly useful for determining the surface profile of wedge-shaped samples (which can be due to non-uniform sample thickness and/or slide thickness), for determining non-uniform thickness profiles for other sample-carrying substrates, and for mounted samples that do not register perfectly against stage 112.

The systems and methods disclosed herein allow determination of the relative position of surface 151 (i.e., relative to object plane 400) to a high level of accuracy, and at the same time, are not dependent upon the nature of the sample or optical signals generated from the sample when the sample is exposed to illumination light. The methods are particularly useful for samples that are imaged in darkfield imaging modes, as the methods permit the coverslip surface (and by extension, the sample itself) to be accurately located along the z-coordinate direction, reducing the complexity of the problem of finding and imaging tissue of interest, and avoiding the use of darkfield imaging modes to locate the sample along the z-direction.

Typically, the methods are used when a mounted sample is first positioned on stage 112. After the relative position of the coverslip surface is determined (i.e., the position adjustment $\Delta z_{obj}$ is calculated), control system 118 can then determine a system offset to be applied to system 100 based on the expected thicknesses of the coverslip and sample. In general, as the methods disclosed herein are used to determine the position adjustment of surface 151 (i.e., the upper surface of the coverslip), the system offset can be calculated as the sum of the position adjustment, the thickness of the coverslip, and the thickness of the sample.

Control system 118 can then apply the system offset to system 100 by translating the sample in the z-direction (via stage 112) and/or translating objective lens 108 in the z-direction (via lens mount 110), so that the sample on the surface of the slide is positioned in object plane 400. To find tissue of interest on the surface of the slide, control system 118 then translates the sample to different (x,y)-locations via stage 112, and obtains images of the sample which are used to locate tissue of interest. During this process, if the plane of surface 151 (and therefore the plane of the sample) was determined to vary in height (i.e., in the z-direction) relative to object plane 400 over the surface of the sample, control system 118 can also adjust the position of the sample in the z-direction as a function of (x,y)-location to ensure that the sample is located in object plane 400 at each location.

Once the tissue is located in all three coordinate dimensions, the tissue can be imaged at high optical power under a variety of different imaging modes, and qualitative and quantitative information can be extracted from the images. As discussed above, control system 118 can replace objective lens 108 with a high power objective lens via rotating lens mount 110. Images of the sample in both brightfield and darkfield imaging modes can be obtained using the high power objective lens and detector 116, and stored for later archiving, inspection, classification, and other types of qualitative and quantitative analysis.

Hardware and Software Implementations

Any of the method steps disclosed herein can be executed by control system 118 (e.g., by electronic processor 124 of control system 118) and/or one or more additional electronic processors (such as computers or preprogrammed integrated circuits) executing programs based on standard programming techniques. Such programs are designed to execute on programmable computing apparatus or specifically designed integrated circuits. Control system 118 can include a data storage system (including memory and/or storage elements), at least one input device, and at least one output device, such as a display. The programs, when executed by control system 118, cause control system 118 to perform the control, computing, and output functions disclosed herein. Each program can be implemented in a high-level procedural or object-oriented programming language, or an assembly or machine language. Furthermore, the language can be a compiled or interpreted language. Each such computer program can be stored on a tangible computer readable storage medium (e.g., optical storage medium such as CD-ROM or DVD, magnetic storage medium, and/or persistent solid state storage medium).

OTHER EMBODIMENTS

A number of embodiments have been described. Nevertheless, it will be understood that various modifications may be made without departing from the spirit and scope of the disclosure. Accordingly, other embodiments are within the scope of the following claims.

What is claimed is:

1. A method, comprising:
   (a) positioning a first surface of a coverslip overlying a sample relative to an object plane of a microscope system, wherein the sample is on an opposite side of the coverslip from the first surface;
   (b) projecting a two-dimensional pattern of light onto the first surface, wherein a focal plane of the two-dimensional pattern at a position of the surface is rotated by an angle $\beta$ relative to the object plane;
   (c) obtaining a two-dimensional image of the pattern of light reflected from the first surface using a detector comprising an imaging sensor oriented perpendicular to a direction of propagation of the reflected pattern of light at the sensor;
   (d) analyzing the image to determine a best focus position for the pattern within the image; and
   (e) determining a position of the sample relative to the object plane based on an offset of the best focus position from an expected position within the image.

2. The method of claim 1, further comprising determining a system adjustment based on the sample position.

3. The method of claim 2, further comprising re-positioning the sample according to the system adjustment.

4. The method of claim 1, further comprising re-positioning the sample based on the position of the sample.

5. The method of claim 4, further comprising re-positioning the sample so that the sample is located in the object plane.

6. The method of claim 1, further comprising determining the expected position within the image.

7. The method of claim 1, further comprising:
   for each one of a plurality of different locations on the first surface of the coverslip, repeating steps (b)-(e) to determine a position of the sample; and
   determining whether the position of the sample relative to the object plane varies according to measurement location on the first surface.

8. The method of claim 1, wherein $\beta$ is between 10 degrees and 30 degrees.

9. The method of claim 1, wherein the two-dimensional pattern of light comprises an array of alternating regions of higher light intensity and lower light intensity extending linearly in a common direction.

10. The method of claim 1, further comprising generating the two-dimensional pattern of light by projecting light generated by a light source through a transmissive Ronchi grating.

11. The method of claim 9, wherein analyzing the image to determine the best focus position for the pattern within the image comprises:
    calculating a gradient image from the image of the pattern of light reflected from the first surface of the coverslip, wherein the gradient image comprises alternating regions of higher light intensity and lower light intensity extending linearly in a common direction;
    for each one of a plurality of rows of pixels in the gradient image extending across the alternating regions of higher light intensity and lower light intensity:
    identifying a set of local light intensity maxima within the row of pixels; and
    determining an average intensity maximum for the set of local light intensity maxima; and
    identifying the best focus position as a position corresponding to the row among the plurality of rows for which the corresponding average intensity maximum is largest.

12. The method of claim 9, wherein the image of the pattern of light comprises alternating regions of higher light intensity and lower light intensity extending linearly in a common direction, and wherein analyzing the image to determine the best focus position comprises, for each one of a plurality of rows of pixels extending across the regions of higher light intensity and lower light intensity:
    determining an average intensity for the pixels in the row;
    determining an intensity variance for the pixels in the row; and
    identifying the best focus position as a position corresponding to the row among the plurality of rows for which a ratio of the intensity variance to the average intensity for the pixels in the row is largest.

13. The method of claim 9, wherein the image of the pattern of light comprises alternating regions of higher light intensity and lower light intensity extending linearly in a common direction, and wherein analyzing the image to determine the best focus position comprises, for each one of a plurality of rows of pixels extending across the regions of higher light intensity and lower light intensity:
    determining an average intensity of pixels in the row that correspond to the regions of higher light intensity, $A_{high}$;

determining an average intensity of pixels in the row that corresponding to the regions of lower light intensity, $A_{low}$; and identifying the best focus position as a position corresponding to the row among the plurality of rows for which $|A_{high}-A_{low}|$ is largest.

14. The method of claim 1, wherein determining the position of the sample relative to the object plane comprises calculating the position based on a linear function of the offset of the best focus position from the expected position within the image.

15. The method of claim 1, wherein:

analyzing the image to determine the best focus position for the pattern within the image comprises determining whether individual rows each comprising multiple pixels in the image or in a gradient image derived from the image correspond to the best focus position;

the individual rows correspond to a range of different offsets from the expected position; and the range of different offsets corresponds to a range of different positions of the sample relative to the object plane that spans at least 50 microns.

16. The method of claim 15, wherein the range of different positions of the sample spans at least 100 microns.

17. The method of claim 15, wherein the range of different positions of the sample spans at least 300 microns.

18. The method of claim 1, further comprising projecting the two-dimensional pattern of light onto the surface using an objective lens having an optical power of 10× or less.

19. The method of claim 18, wherein the objective lens has an optical power of 4× or less.

20. The method of claim 1, wherein the pattern of light comprises an array of alternating regions of higher light intensity and lower light intensity extending linearly in a common direction, wherein the focal plane of the two-dimensional pattern at the position of the first surface is rotated about an axis within a plane parallel to the object plane, and wherein the axis is orthogonal to the common direction.

21. A system, comprising:

an illumination source configured to generate illumination light;

an optical element configured to modulate the illumination light to generate a two-dimensional pattern of light;

an apparatus configured to project the two-dimensional pattern of light onto a first surface of a coverslip overlying a sample, wherein the sample is on an opposite side of the coverslip from the first surface;

a stage configured to support the sample;

a detector configured to obtain a two-dimensional image of the pattern of light reflected from the first surface and comprising an imaging sensor oriented perpendicular to a direction of propagation of the reflected pattern of light at the sensor; and a controller connected to the illumination source, the projection objective, the stage, and the detector, wherein the optical element is positioned so that a focal plane of the two-dimensional pattern is rotated by an angle β relative to a plane of the surface; and wherein during operation of the system, the controller is configured to:

(a) position the first surface of the coverslip relative to an object plane of the system;

(b) project the two-dimensional pattern of light onto the first surface of the coverslip using the illumination source, the optical element, and the apparatus;

(c) obtain the two-dimensional image of the pattern of light reflected from the first surface of the coverslip;

(d) analyze the image to determine a best focus position of the pattern within the image; and (e) determine a position of the sample relative to the object plane based on an offset of the best focus position from an expected position within the image.

22. The system of claim 21, wherein the controller is configured to determine a system adjustment based on the sample position.

23. The system of claim 22, wherein the controller is configured to re-position the sample according to the system adjustment.

24. The system of claim 21, wherein the controller is configured to re-position the sample based on the position of the sample.

25. The system of claim 24, wherein the controller is configured to re-position the sample so that the sample is located in the object plane.

26. The system of claim 21, wherein the controller is configured to determine the expected position within the image.

27. The system of claim 21, wherein the controller is configured to:

for each one of a plurality of different locations on the first surface of the coverslip, repeat steps (b)-(f) to determine a position of the sample; and determine whether the position of the sample relative to the object plane varies according to measurement location on the first surface.

28. The system of claim 21, wherein β is between 10 degrees and 30 degrees.

29. The system of claim 21, wherein the two-dimensional pattern of light comprises an array of alternating regions of higher light intensity and lower light intensity extending linearly in a common direction.

30. The system of claim 21, wherein the optical element comprises an array of alternating regions of higher optical density and lower optical density forming a transmission grating, and wherein the regions extend linearly in a common direction.

31. The system of claim 30, wherein the optical element is oriented so that a plane of the optical element is rotated by an angle α relative to the object plane, and about an axis positioned in a plane parallel to the object plane and orthogonal to the common direction.

32. The system of claim 29, wherein the controller is configured to analyze the image to determine the best focus position for the pattern within the image by:

calculating a gradient image from the image of the pattern of light reflected from the first surface of the coverslip, wherein the gradient image comprises alternating regions of higher light intensity and lower light intensity extending linearly in a common direction;

for each one of a plurality of rows of pixels in the gradient image extending across the alternating regions of higher light intensity and lower light intensity:

identifying a set of local light intensity maxima within the row of pixels; and determining an average intensity maximum for the set of local light intensity maxima; and identifying the best focus position as a position corresponding to the row among the plurality of rows for which the corresponding average intensity maximum is largest.

33. The system of claim 29, wherein the image of the pattern of light comprises alternating regions of higher light intensity and lower light intensity extending linearly in a common direction, and wherein the controller is configured to analyze the image to determine the best focus position by:

for each one of a plurality of rows of pixels extending across the regions of higher light intensity and lower light intensity:
determining an average intensity for the pixels in the row; and
determining an intensity variance for the pixels in the row; and
identifying the best focus position as a position corresponding to the row among the plurality of rows for which a ratio of the intensity variance to the average intensity for the pixels in the row is largest.

34. The system of claim 29, wherein the image of the pattern of light comprises alternating regions of higher light intensity and lower light intensity extending linearly in a common direction, and wherein the controller is configured to analyze the image to determine the best focus position by:

for each one of a plurality of rows of pixels extending across the regions of higher light intensity and lower light intensity:
determining an average intensity of pixels in the row that correspond to the regions of higher light intensity, $A_{high}$; and
determining an average intensity of pixels in the row that correspond to the regions of lower light intensity, $A_{low}$; and
identifying the best focus position as a position corresponding to the row among the plurality of rows for which $|A_{high}-A_{low}|$ is largest.

35. The system of claim 21, wherein the controller is configured to determine the position of the sample relative to the object plane by calculating the position based on a linear function of the offset of the best focus position from the expected position within the image.

36. The system of claim 21, wherein:
the controller is configured to analyze the image to determine the best focus position for the pattern within the image by determining whether individual rows each comprising multiple pixels in the image or in a gradient image derived from the image correspond to the best focus position;
the individual rows correspond to a range of different offsets from the expected position; and
the range of different offsets corresponds to a range of different positions of the sample relative to the object plane that spans at least 50 microns.

37. The system of claim 36, wherein the range of different positions of the sample spans at least 100 microns.

38. The system of claim 36, wherein the range of different positions of the sample spans at least 300 microns.

39. The system of claim 21, wherein the system is configured to determine a position adjustment of the sample of up to 50 microns relative to the position of the sample relative to the object plane.

40. The system of claim 39, wherein the system is configured to determine a position adjustment of the sample of up to 150 microns relative to the position of the sample relative to the object plane.

41. The system of claim 21, wherein the apparatus comprises an objective lens having an optical power of 10× or less.

42. The system of claim 41, wherein the optical power is 4× or less.

* * * * *